United States Patent
Williams et al.

(10) Patent No.: US 9,788,667 B2
(45) Date of Patent: Oct. 17, 2017

(54) LOCK FOR SECURING FRONT RAIL TO WIRE SHELVING

(71) Applicant: Fasteners for Retail, Inc., Twinsburg, OH (US)

(72) Inventors: Richard A. Williams, Akron, OH (US); Gerald Matthew Szpak, Brecksville, OH (US)

(73) Assignee: Fasteners for Retail, Inc., Twinsburg, OH (US)

( * ) Notice: Subject to any disclaimer, the term of this patent is extended or adjusted under 35 U.S.C. 154(b) by 265 days.

(21) Appl. No.: 14/332,779

(22) Filed: Jul. 16, 2014

(65) Prior Publication Data

US 2015/0023727 A1 Jan. 22, 2015

Related U.S. Application Data

(60) Provisional application No. 61/846,876, filed on Jul. 16, 2013.

(51) Int. Cl.
| | |
|---|---|
| A47F 5/00 | (2006.01) |
| A47B 96/02 | (2006.01) |
| F16B 5/06 | (2006.01) |
| F16B 12/42 | (2006.01) |
| F16B 2/08 | (2006.01) |
| F16B 17/00 | (2006.01) |
| A47B 55/02 | (2006.01) |

(52) U.S. Cl.
CPC .......... *A47F 5/0056* (2013.01); *A47F 5/0031* (2013.01); *F16B 2/08* (2013.01); *F16B 5/0685* (2013.01); *F16B 12/42* (2013.01); *F16B 17/008* (2013.01); *A47B 55/02* (2013.01); *Y10T 403/3906* (2015.01)

(58) Field of Classification Search
None
See application file for complete search history.

(56) References Cited

U.S. PATENT DOCUMENTS 3,225,720 A * 12/1965 Maslow ................. A47B 55/02
108/181
3,763,794 A * 10/1973 Fleck .................... A47B 96/067
108/181

(Continued)

OTHER PUBLICATIONS

FFR MerchandisingTotal Retail Solutions 2014 Product Catalog (cover, and pp. 232, 235, 236).

*Primary Examiner* — Joshua J Michener
*Assistant Examiner* — Kyle Walraed-Sullivan
(74) *Attorney, Agent, or Firm* — Honigman Miller Schwartz and Cohn LLP

(57) ABSTRACT

A fastener for securing a rail to a wire shelf having a plurality of support rods extending in parallel spaced-apart fashion. The fastener has a fastener body with an elongate rail engaging flange, a shelf engaging flange, and a connecting shaft portion extending between the rail engaging flange and the shelf engaging flange. The rail engaging flange is insertable through an elongate opening of an the rail in a first orientation and, upon rotation of the fastener, the rail engaging flange is configured to extend across said elongate opening thereby restricting withdrawal therefrom, while the shelf engaging flange traps a support member of the shelf thereby interlocking the associated rail to the associated shelf.

15 Claims, 22 Drawing Sheets

(56) References Cited

U.S. PATENT DOCUMENTS

| | | | | |
|---|---|---|---|---|
| 4,102,587 A * | 7/1978 | Herb | E04G 17/001 | 248/188 |
| 4,316,593 A * | 2/1982 | Miner | A47F 5/14 | 211/90.03 |
| 4,374,498 A * | 2/1983 | Yellin | A47B 55/02 | 108/152 |
| 4,589,349 A * | 5/1986 | Gebhardt | A47B 96/025 | 108/102 |
| 5,597,077 A * | 1/1997 | Hartmann | A47F 5/0056 | 211/134 |
| 6,409,031 B1 * | 6/2002 | Wynne | A47B 55/02 | 108/181 |
| 8,393,821 B2 * | 3/2013 | Wiberg | F16B 2/185 | 403/388 |
| 2003/0108385 A1 * | 6/2003 | Finco | H02G 3/0443 | 403/396 |
| 2003/0150968 A1 * | 8/2003 | Garassino | H02G 3/263 | 248/220.22 |
| 2007/0023374 A1 * | 2/2007 | Nawrocki | A47F 5/0846 | 211/90.01 |
| 2011/0286785 A1 * | 11/2011 | Brouwer | H02G 3/0443 | 403/188 |
| 2013/0078035 A1 | 3/2013 | Mueller et al. | | |
| 2013/0266394 A1 * | 10/2013 | Reznar | B60R 13/0206 | 411/122 |
| 2013/0306583 A1 * | 11/2013 | Caldwell | A47B 57/581 | 211/181.1 |
| 2014/0061143 A1 * | 3/2014 | Hu | A47B 88/04 | 211/133.5 |
| 2014/0291266 A1 * | 10/2014 | Yang | A47B 96/00 | 211/126.15 |

* cited by examiner

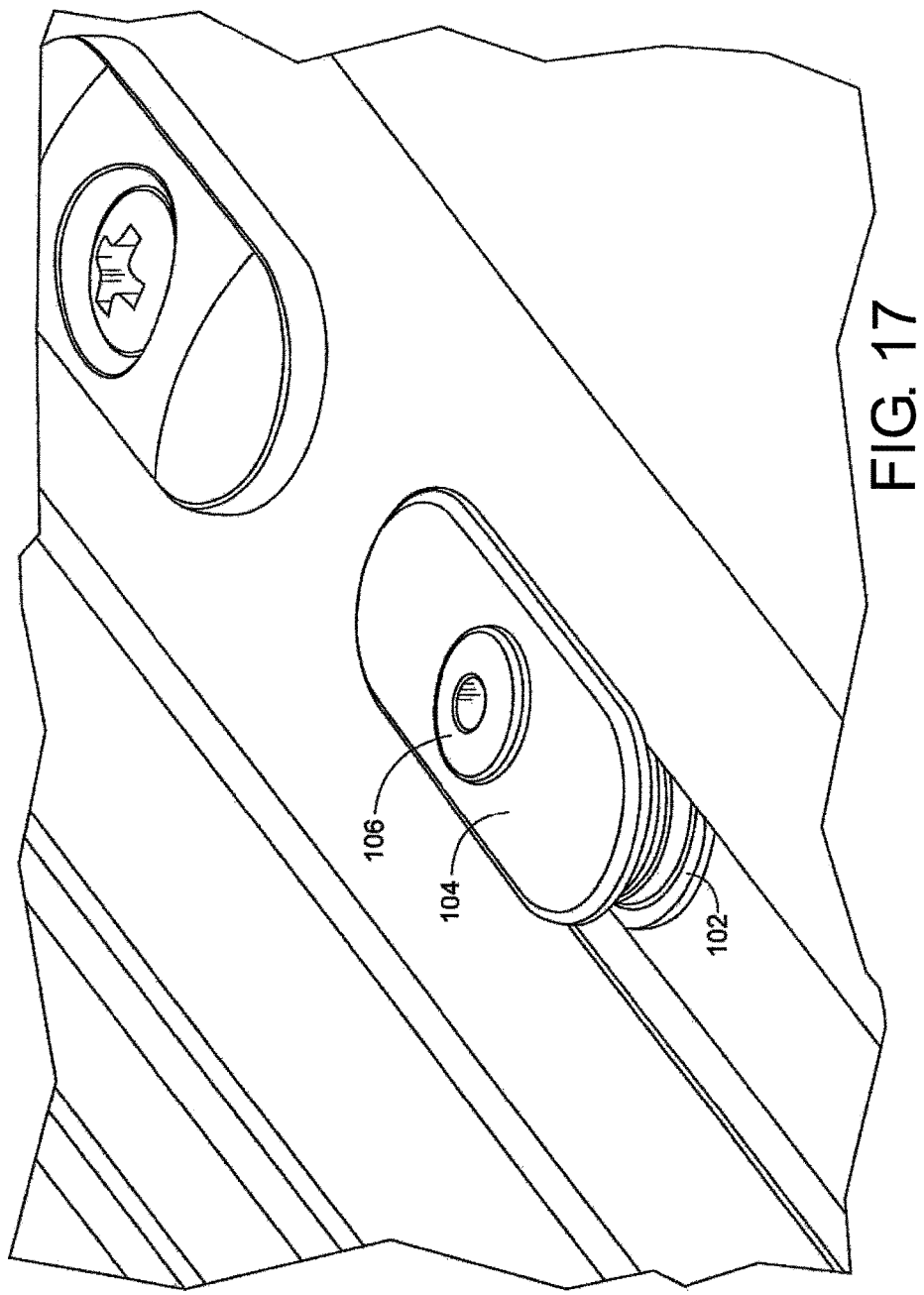

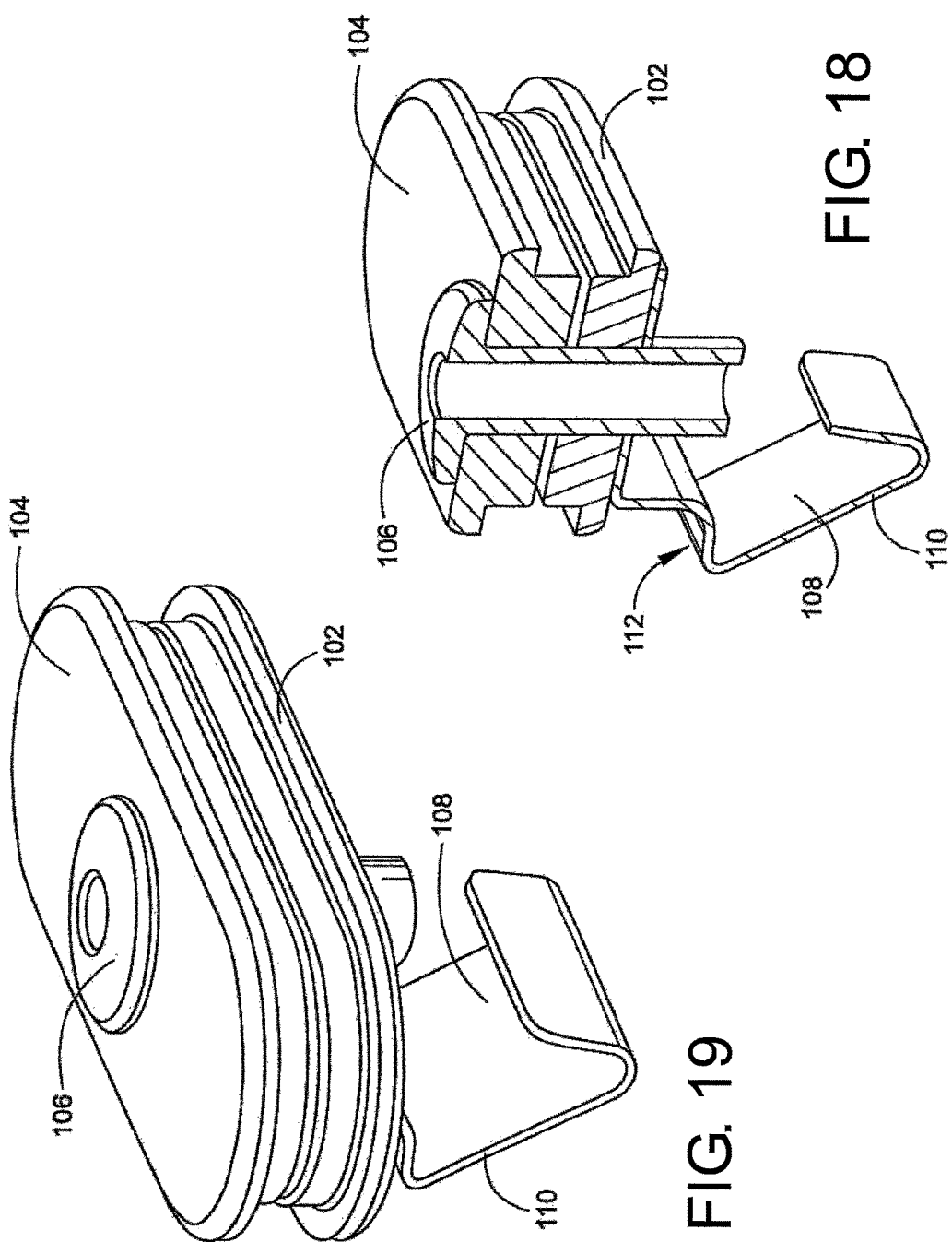

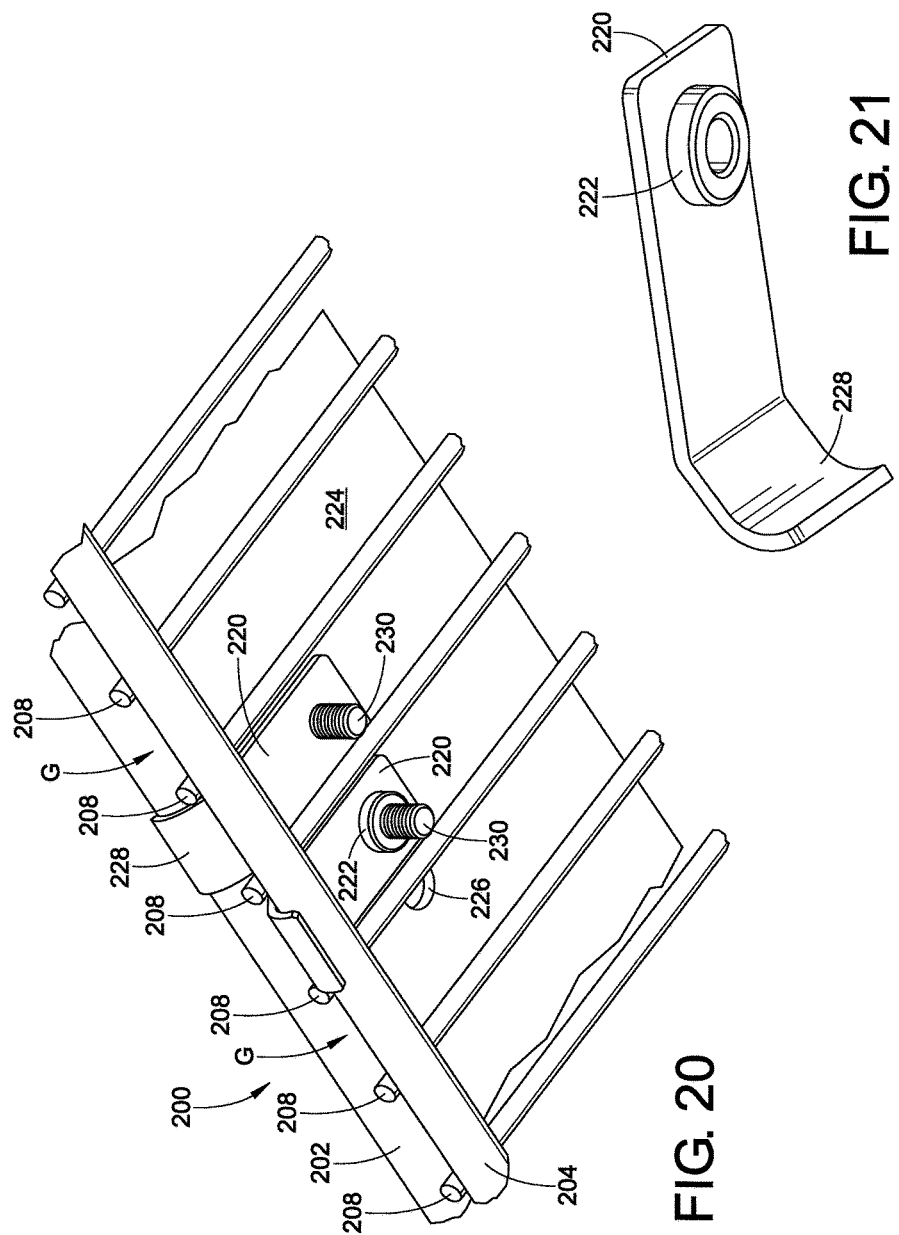

LOCK FOR SECURING FRONT RAIL TO WIRE SHELVING

CROSS REFERENCE TO RELATED PATENTS AND APPLICATIONS

This application claims priority to and the benefit of the filing date of U.S. Provisional Patent Application Ser. No. 61/846,876, filed Jul. 16, 2013, which application is hereby incorporated by reference.

BACKGROUND

The present disclosure pertains generally to adjustable merchandising systems for shelving. More specifically, the present disclosure pertains to locks/fasteners for securing a front rail to wire shelving.

Shelving is used extensively for stocking and storing products or merchandise in a variety of stores. For a number of important merchandising considerations, it is desirable that merchandise be displayed at the front of a shelf so that a customer is induced to purchase the article. For example if the goods are perishable or are subject to becoming stale (e.g., cigarettes, fruit juices, dairy products or any item with an expiration date or a freshness date), it is important that the articles be removed in a first in, first out basis in order to maintain freshness. Also, if merchandise is not displayed at the front of the shelf, it may not catch the shopper's eye which may cost the merchant sales.

In order to automatically move an item forward on a shelf as the one before it is removed, several types of forward feed devices have been devised. These devices generally fall into three categories. The first category is inclined tracks. These rely on gravity to feed, slide or roll products forward. The second category employs conveyor belts which still use gravity to effect a forward movement. The third category uses spring biased paddles to feed the product forward. Whichever forward feed mechanism is employed, it is necessary that the front of the shelf be provided with a barrier or fence, so that the merchandise urged forward does not fall off the shelf.

Commonly assigned U.S. patent application Ser. No. 13/625,305 discloses a variety of fasteners for securing a front rail to a shelf having a plurality of perforations. In U.S. patent application Ser. No. 13/625,305, the fasteners are formed integrally with the front rail element such that the front rail is easily secured to the shelf without the need for separate fastener elements.

BRIEF DESCRIPTION

While the aforementioned rail assembly with integral fasteners represents an improvement for securing rails to perforated shelves, a need has been identified for improved locks/fasteners for securing a front rail to wire shelving such as the kind often found in retail displays. Such wire shelves generally have wire support elements running either perpendicularly to or parallel to the front of the display where a customer accesses products stored thereon. The spacing between the individual wires of the wire shelves is such that prior art front rails and fastening elements such as those described in application Ser. No. 13/625,305 are not generally suitable for use therewith.

In accordance with one aspect, a fastener for securing an associated rail to an associated wire shelf having a plurality of support rods extending in parallel spaced-apart fashion comprises a fastener body including an elongate rail engaging flange, a shelf engaging flange, and a connecting shaft extending between and connecting the rail engaging flange and the shelf engaging flange. The connecting shaft has a generally cylindrical cross-section along a portion of its length and a reduced diameter portion defining a shoulder, and at least one cam structure extending therefrom in a direction towards the rail engaging flange. The cam structure is spaced apart from the connecting shaft and defines a channel therewith for receipt of a support rod of the associated wire shelf. The rail engaging flange is insertable through an elongate opening of an associated rail in a first orientation and, upon rotation of the fastener to a second position, the rail engaging flange is configured to extend across said elongate opening thereby restricting withdrawal therefrom, while the shelf engaging flange traps a support rod of the associated shelf in the channel thereby interlocking the associated rail to the associated shelf.

In accordance with another aspect, a fastener for securing an associated rail to an associated wire shelf having a plurality of spaced apart support rods extending in a common direction comprises a fastener body comprising a rail engaging member, a shelf engaging member spaced apart from the rail engaging member, the shelf engaging member including at least one contact structure that is adapted to engage a support rod of the associated wire shelf, and a connecting portion extending between the rail engaging member and the shelf engaging member. The connecting portion of the fastener is received in an elongate opening of the associated rail and the contact structure of the rail engaging member engages a support rod of the associated wire shelf.

In accordance with yet another aspect, a system is set forth for securing a rail to an associated wire shelf having a width and a length, a perimeter rod extending along and defining a leading edge of the wire shelf, the perimeter rod extending in a length direction, and a plurality of spaced apart support rods extending in parallel in a width direction. The system comprises a rail configured to be supported along the leading edge of the wire shelf, the rail including at least one elongate opening adapted to extend along the length direction when the rail is supported on the shelf, and a fastener for securing the rail to the perimeter rod of the associated wire shelf. The fastener includes a fastener body having an elongate shape with a width slightly less than a spacing between adjacent support rods of the associated shelf such that the body can be at least partially received therebetween, a threaded insert supported in the fastener body, and a threaded fastener extending through the elongate opening and threadedly engaged with the threaded insert, the fastener body further including a hook adapted to extend partially around and engage the perimeter rod of the associated shelf when a head of the fastener is tightened against the rail thereby securing the rail to the associated wire shelf.

In accordance with yet another aspect, a fastener for securing an associated rail to an associated wire shelf having a width and a length, a perimeter rod extending along and defining a leading edge of the wire shelf, the perimeter rod extending in a length direction, and a plurality of spaced apart support rods extending from the perimeter rod in parallel in a width direction, the fastener comprises a fastener body having an elongate shape with a width slightly less than a spacing between adjacent support rods of the associated wire shelf such that the body can be at least partially received therebetween, a threaded insert supported in the fastener body for receiving a threaded fastener extending through the elongate opening of the associated wire shelf, and a hook extending from the fastener body and adapted to extend partially around and engage the perimeter rod of the associated wire shelf when a head of the fastener is tightened against the associated rail thereby securing the associated rail to the associated wire shelf.

BRIEF DESCRIPTION OF THE DRAWINGS

FIG. 17 is a top perspective view of the fastener of FIG. 16;

FIG. 18 is a cross-sectional view of the fastener of FIG. 16;

FIG. 19 is a perspective view of the fastener of FIG. 16;

FIG. 20 is a bottom perspective view of a rail secured to a shelf with another exemplary fastener in accordance with the present disclosure;

FIG. 21 is a perspective view of the fastener of FIG. 20;

DETAILED DESCRIPTION

Figure 1:
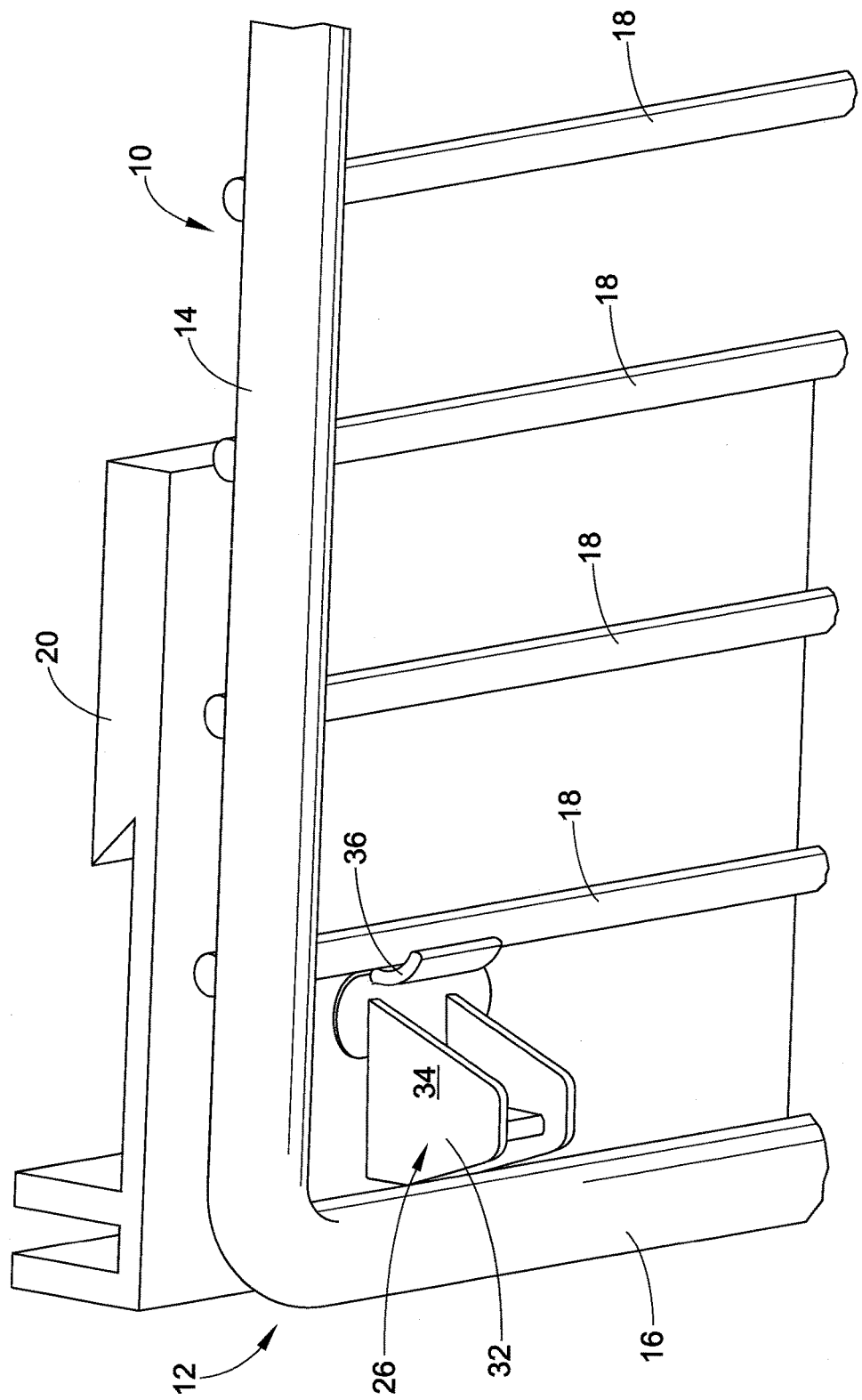
FIG. 1 is a bottom perspective view of an exemplary embodiment of a fastener for securing a rail to a wire shelf in accordance with the present disclosure.
Figure 2:
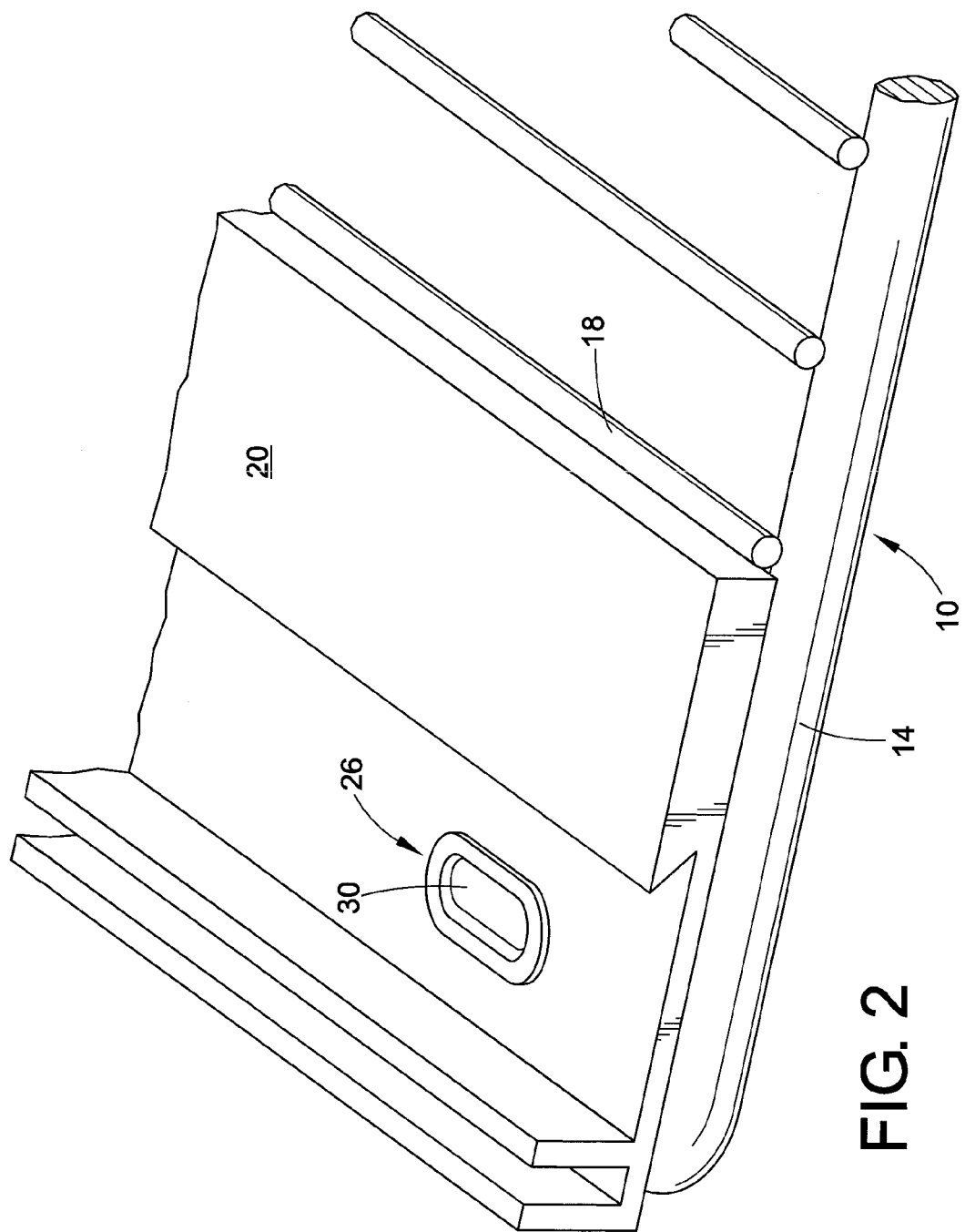
FIG. 2 is a top perspective top view of the embodiment of FIG. 1.
Figure 3:
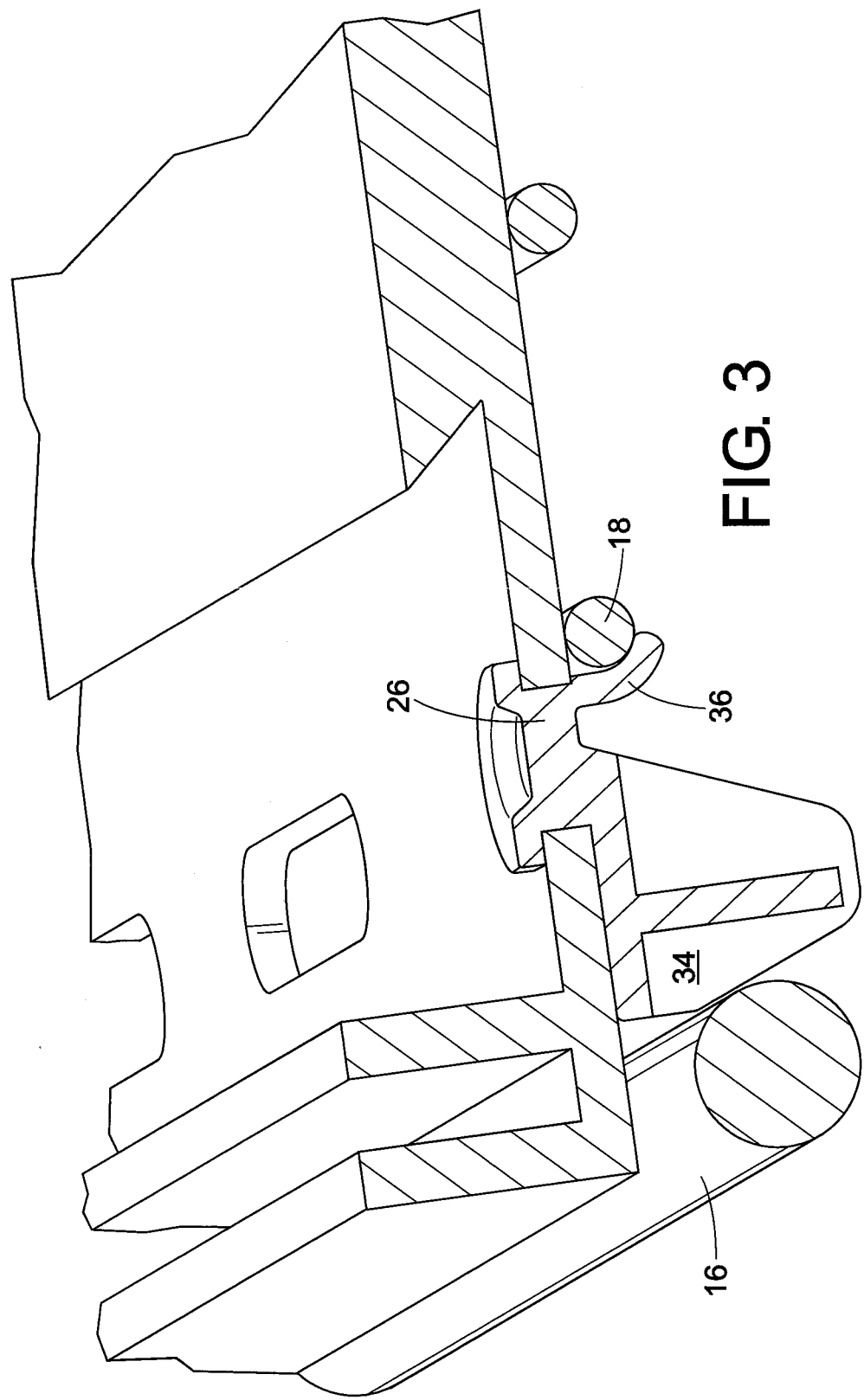
FIG. 3 is a cross-sectional view of the embodiment of FIG. 1.

Referring now to the drawings wherein the showings are for purposes of illustrating several embodiments of the present disclosure and not for purposes of limiting same, FIGS. 1-3 illustrate a first exemplary embodiment of a fastener for securing a rail to wire shelving in accordance with the present disclosure. It will be appreciated that a portion of a wire shelf generally identified by reference numeral 10 includes a perimeter rod 12 having a side portion 14 and a front portion 16. A plurality of smaller diameter support rods 18 extend between side portion 14 and an opposite side portion (not shown). These can be oriented generally parallel to the front portion 16 of the perimeter rod 12. Wire shelf 10 is exemplary in nature and it will be appreciated that aspects of the present disclosure can be used with a wide variety of different shelf designs and configurations. For ease in describing the following embodiments, the wire shelf 10 will be referred to as a horizontal wire shelf because the support rods 18 run horizontally when viewed from the front of the shelf. Later embodiments relate to a wire shelf design having support rods running fore to aft. Such wire shelf will be referred to as a vertical wire shelf. It will be appreciated that even though a particular embodiment is described in connection with one or the other of a horizontal or vertical wire shelf, aspects of such embodiment may be applicable to the other type of shelf as well.

With continued reference to FIGS. 1-3, a rail such as a front rail 20 is shown mounted to the forward portion of wire shelf 10. A fastener 26 is illustrated securing the front rail 20 to the wire shelf 10. The front rail 20 is also exemplary in nature and, therefore, the details of such need not be provided. It will be appreciated that aspects of the present disclosure are applicable to a wide variety of known rails and are not limited to use with the illustrated rail 20. In addition, the locks/fasteners described herein can be used to secure other structures to wire shelves besides the rail shown.

Fastener 26 includes an upper, generally oval-shaped portion 30 thereof, that extends through an opening in the front rail 20, and a lower portion 32 that is positioned between the forward portion 16 of the perimeter rod 12 and a first support rod 18. It will be appreciated that a plurality of fasteners 26 could be installed in in a similar manner in respective openings of the front rail 20 in spaced apart locations.

In one embodiment, the fastener 26 can be heat-staked to retain the fastener 26 in position in the opening of the front rail 20. The front rail 20 with fasteners 26 secured therein can then be snapped into place at the front of the shelf 10 with the lower portion 32 of each fastener 26 creating a retention force as it's wedged and/or snapped into place between the forward portion 16 and the first support rod 18. It will be appreciated that the retention force can be adjusted by changing the thickness of the lower portion 32 of the fastener 26, or by adding small ribs to it, or otherwise increasing its stiffness. As illustrated, the lower portion 32 includes a wedge-like member 34 and a curved retention tab 36 having a surface generally curved to complement an outer circumferential surface of support rod 18.

During installation of the front rail 20 to the shelf 10 the lower portion 32 of the fastener 26 is configured to be pressed into the space between the forward portion 16 of the perimeter rod 12 and the first support rod 18. During such installation, the wedge-like member 34 can help to urge the retention tab into position/engagement with the support rod 18. In this embodiment, the spacing between the forward portion 16 of the perimeter rod 12 and the adjacent support rod 18 should be consistent to ensure a tight fit.

Figure 4:
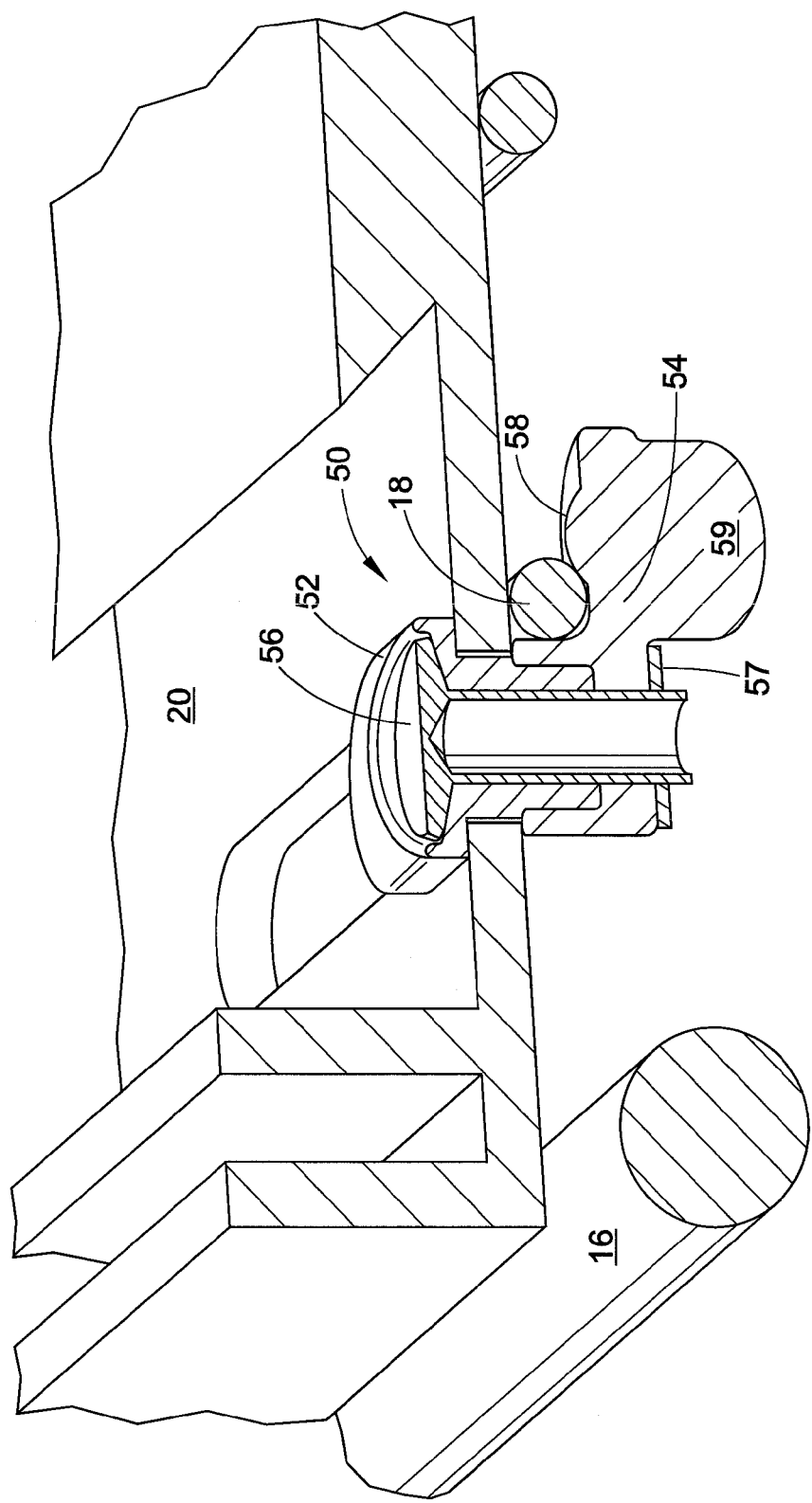
FIG. 4 is a cross-sectional view of another exemplary embodiment of a fastener for securing a rail to a wire shelf in accordance with the present disclosure.
Figure 5:
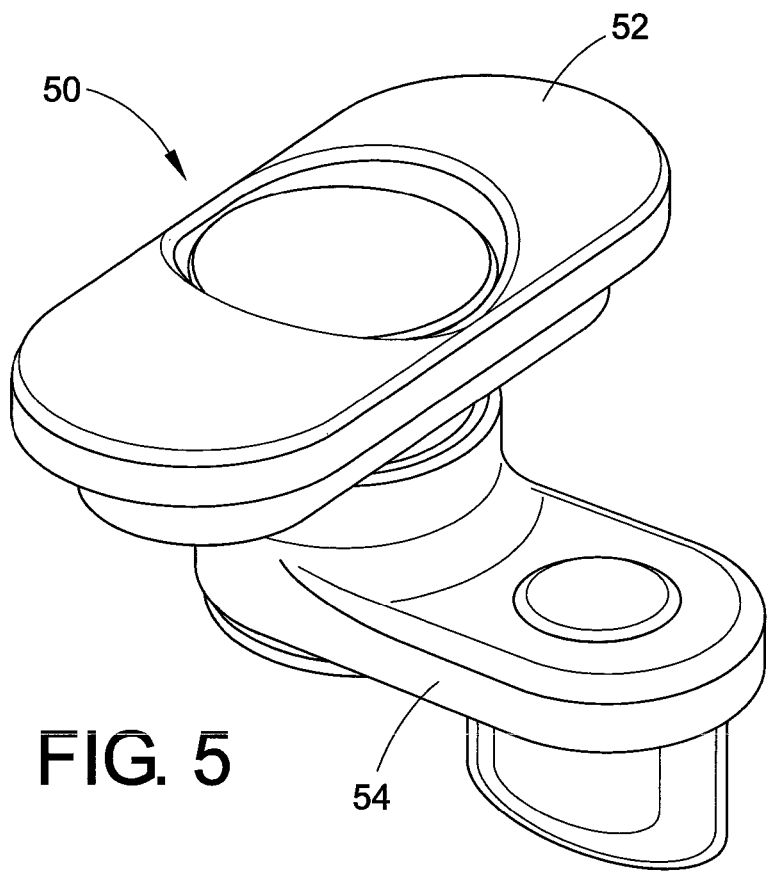
FIG. 5 is a perspective view of the fastener of FIG. 4.
Figure 6:
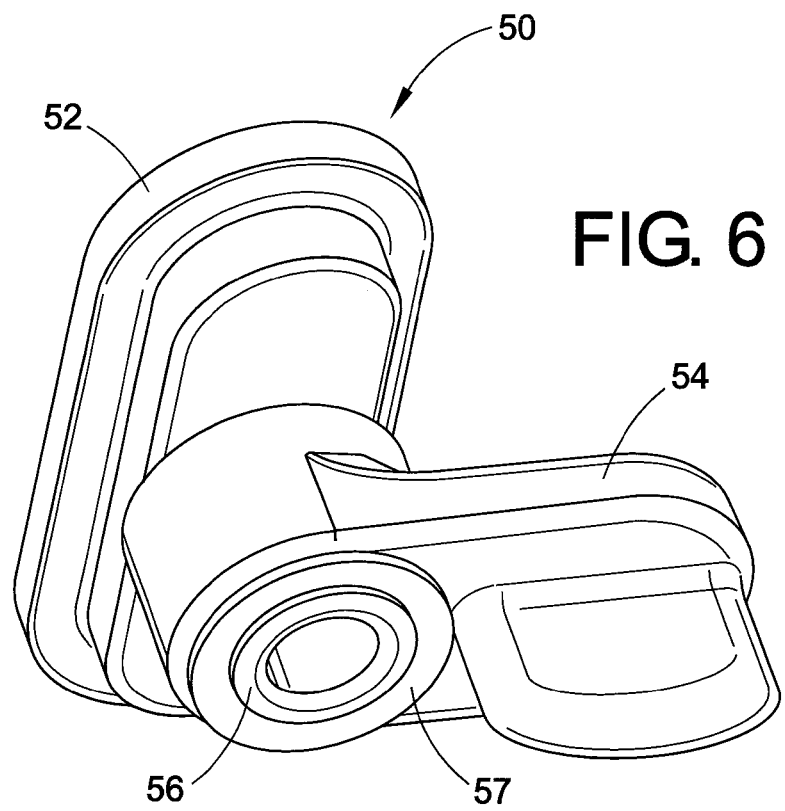
FIG. 6 is another perspective view of the fastener of FIG. 4.

FIGS. 4-6 illustrate another exemplary embodiment in accordance with the present disclosure. In this embodiment, a fastener 50 is illustrated with an upper portion 52 extending through an opening in a front rail 20 and a lower portion 54 engaged with a support rod 18. Upper portion 52 and lower portion 54 are pivotally connected to each other by a rivet 56 and washer 57 that are configured to secure the upper and lower portions 52 and 54 together while permitting lower portion 54 to be rotated relative to upper portion 52 between a first position having its longitudinal axis aligned with the upper portion 52 to permit passage of the lower portion through the opening in rail 20 (this configuration is not shown in the drawings) and a second position (shown in the drawings) whereat the lower portion 54 and the upper portion 52 have their respective longitudinal axes oriented generally perpendicular to one another with the lower portion 52 extending underneath support rod 18.

It will be appreciated that the fastener 50 can be mounted to the front rail 20 at the factory and the front rail 20 can be installed on the wire shelf by the merchant with the lower portion 54 in its first position and then rotated to its second position as shown to secure the front rail 20 to the wire shelf. A dome 58 on the lower portion 54 provides a locking detent as it passes over the cross support wire 18 when the lower portion 54 is moved from its first position to its second position. A finger tab 59 is provided for grasping by the lower portion 54 during installation. In this embodiment, the spacing between the front portion 16 of the perimeter rod 12 and the adjacent support rod 18 can be virtually any distance, and need not necessarily be consistent across the width of the shelf because the fastener 50 only engages the adjacent support rod 18.

Figure 7:
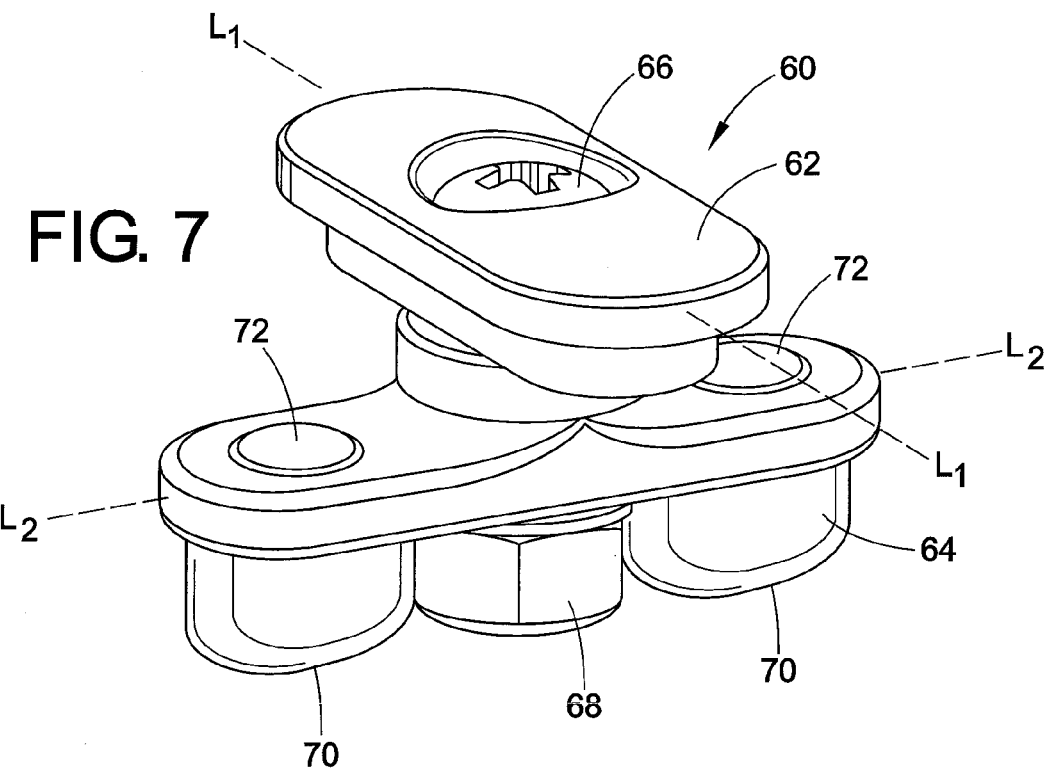
FIG. 7 is a perspective view of yet another exemplary embodiment of a fastener for securing a rail to a wire shelf in accordance with the present disclosure.
Figure 8:
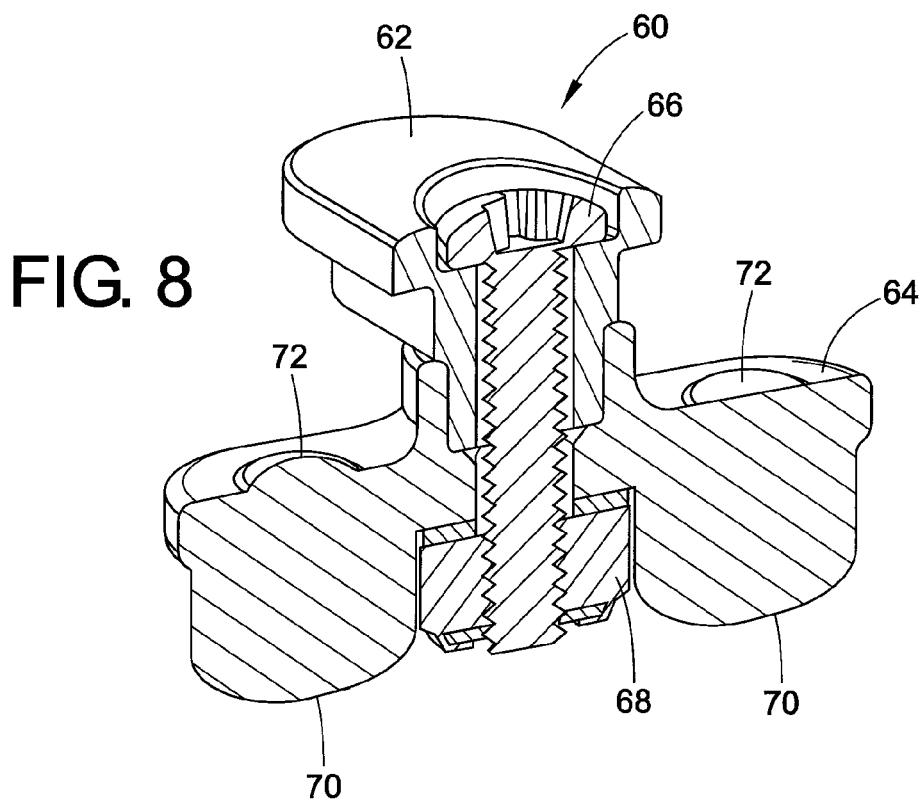
FIG. 8 is a cross-sectional view of the fastener of FIG. 7.
Figure 9:
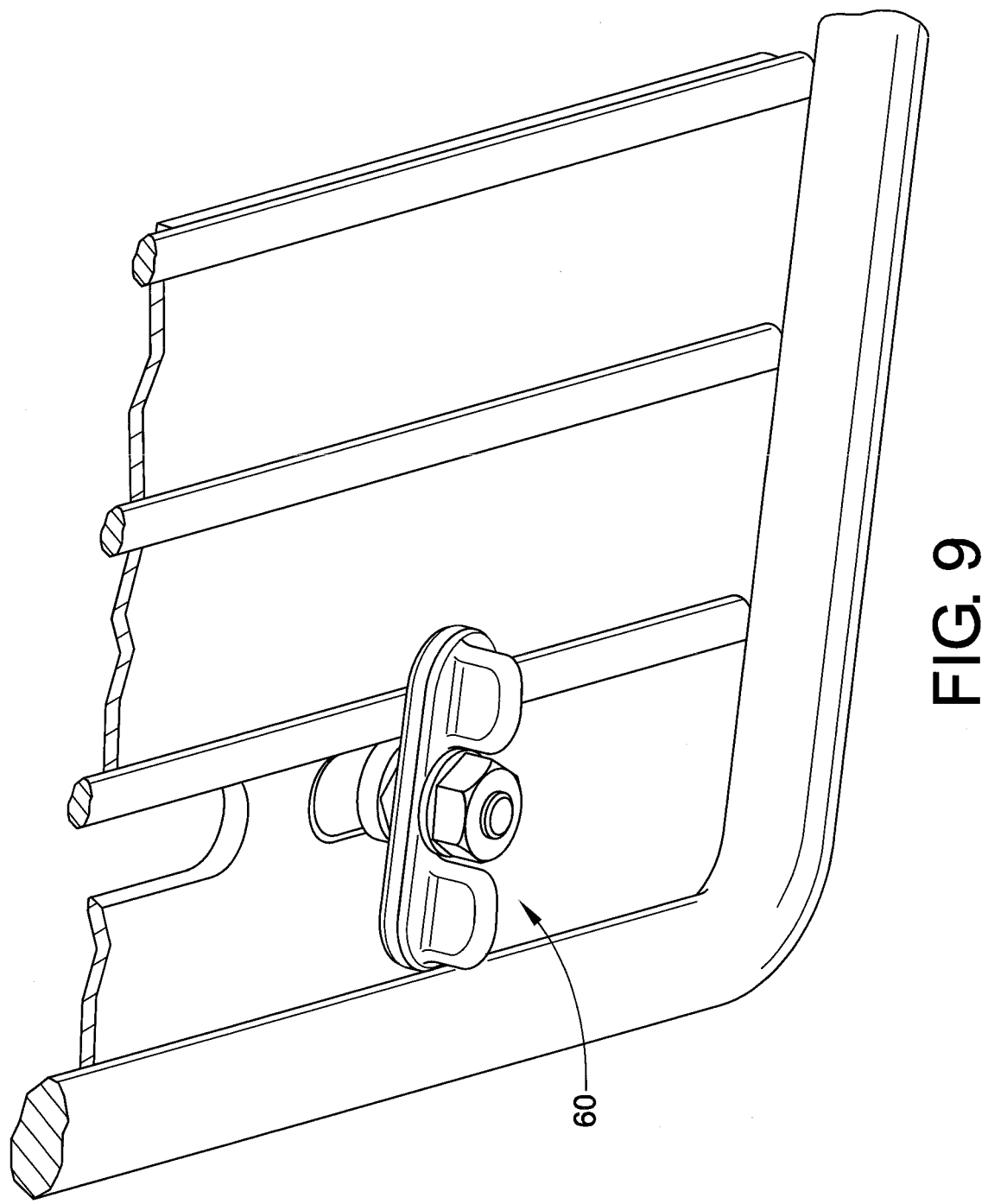
FIG. 9 is a bottom perspective view of the fastener of FIG. 7 securing a rail to a wire shelf.

FIGS. 7-9 illustrate another embodiment of a fastener in accordance with the present disclosure. Fastener 60 is similar to fastener 50 in that it includes an upper portion 62 and a lower portion 64 that are rotatably mounted to each other. Like fastener 50, fastener 60 is rotatable between a first position whereat a longitudinal axis L1 of the upper portion 62 is oriented parallel to a longitudinal axis L2 of the lower portion 64 (not shown in the figures) and a second position, or lock position, whereat longitudinal axis L1 is oriented generally perpendicular to longitudinal axis L2 as shown.

Fastener 60 utilizes a screw 66 (in place of the rivet 56) and a nut 68 for securing the upper and lower portions together. In addition, and unlike fastener 50, a finger tab 70 and detent domes 72 are provided on each side of the axis of rotation of the lower portion 64. By providing finger tabs 70 on each side of the axis of rotation of the lower portion 64, the lower portion 64 may be more easily rotated in between the first and second positions.

Figure 10:
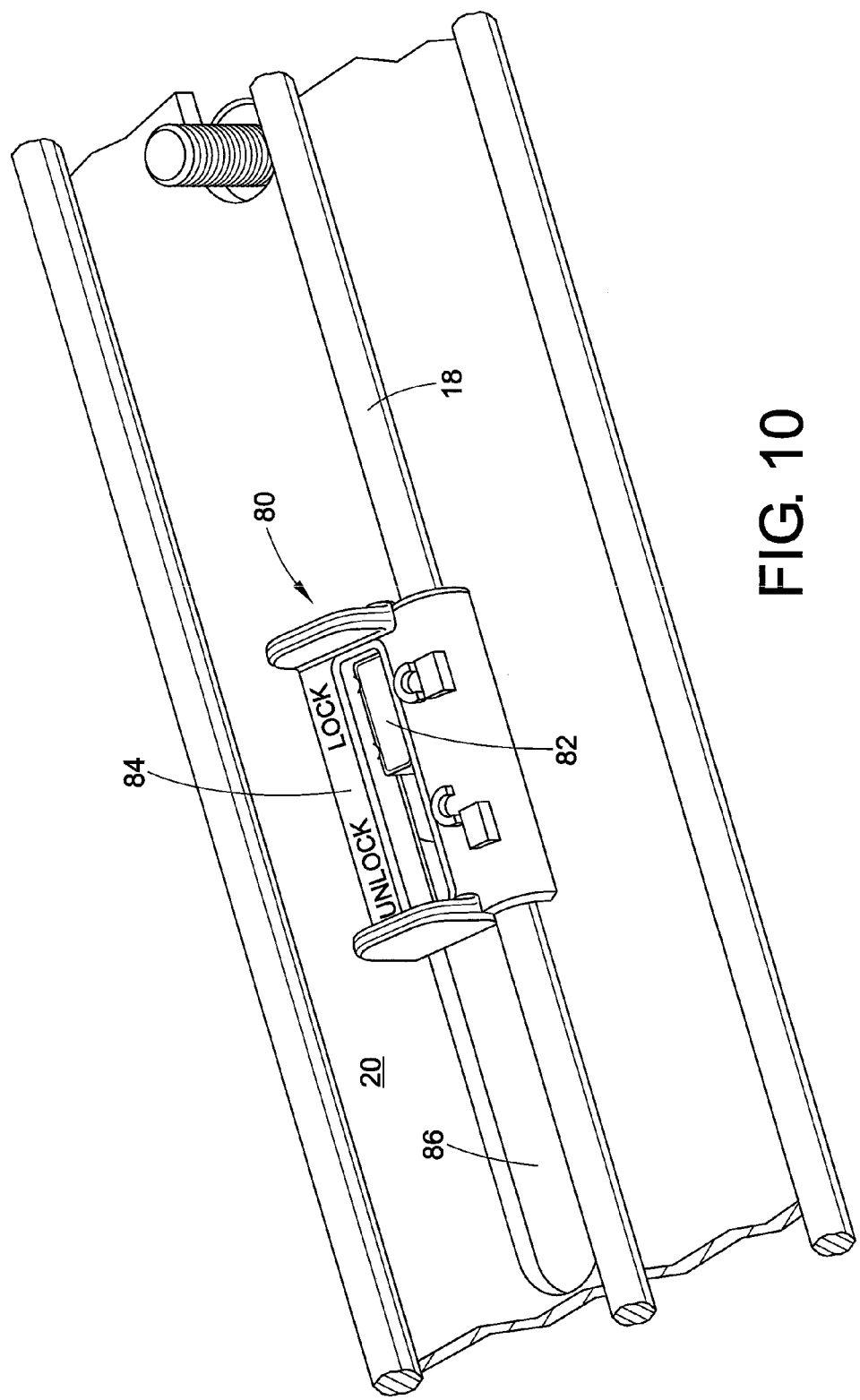
FIG. 10 is a top perspective view of still another exemplary embodiment of a fastener for securing a rail to a wire shelf in accordance with the present disclosure.
Figure 11:
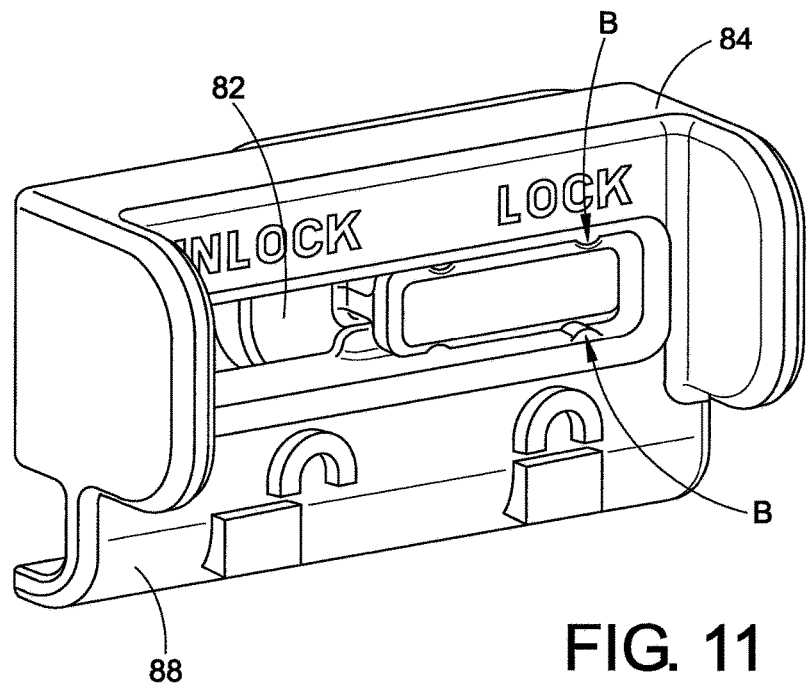
FIG. 11 is a perspective view of the fastener of FIG. 10.
Figure 12:
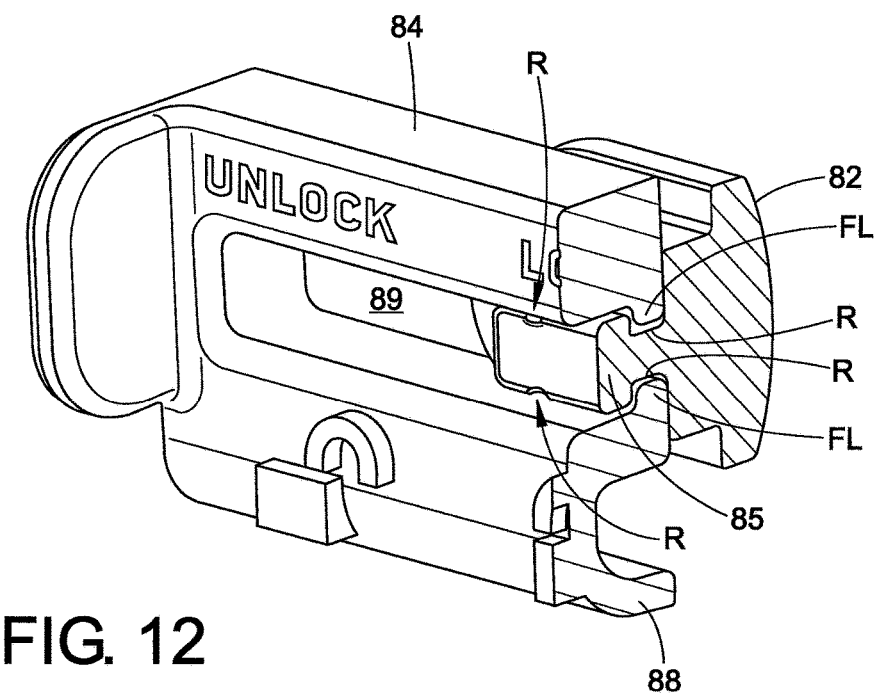
FIG. 12 is a cross-sectional view of the fastener of FIG. 10.

FIGS. 10-12 illustrate yet another exemplary embodiment in accordance with the present disclosure. In this embodiment, a two-part fastener 80 includes an upper portion 82 and a lower portion 84. Upper portion 82 includes a tab 85 that is insertable through a slot or opening 86 in front rail 20. Lower portion 84 includes a curved retaining tab 88 adapted to engage a support rail 18. Lower portion 84 also includes a slot 89 for receiving tab 85 of the upper portion 82. First and second flanges FL extend inwardly toward each other within the slot 89 and are adapted to mate with respective recesses R on the tab 85 when the upper and/or lower members 82, 84 are moved between the unlocked position and the locked position. Once the tab 85 is engaged with flanges FL, the tab 85 interlocks the upper portion 82 with the lower portion 84 with the front rail 20 trapped therebetween. In this manner, the fastener 80 secures the front rail 20 to the shelf. A detent mechanism, in the form of raised bumps B (FIG. 11) on the walls of the lower portion 84 forming slot 89 and cooperating recesses R (FIG. 12) in the tab 85, secure the tab 85 in the locked position.

It will be appreciated that to assemble fastener 80, the front rail 20 is positioned on the shelf 10, the lower portion 84 is positioned on a support rod 18 while the upper portion 82 is inserted through the opening 86 and into the lower portion 84 with the tab 85 in the unlocked position. The upper portion 82 and/or lower portion 84 are then slid relative to each other until the tab 85 is received in the locked position thereby interlocking the two components together and securing the front rail 20 to the shelf.

Figure 13:
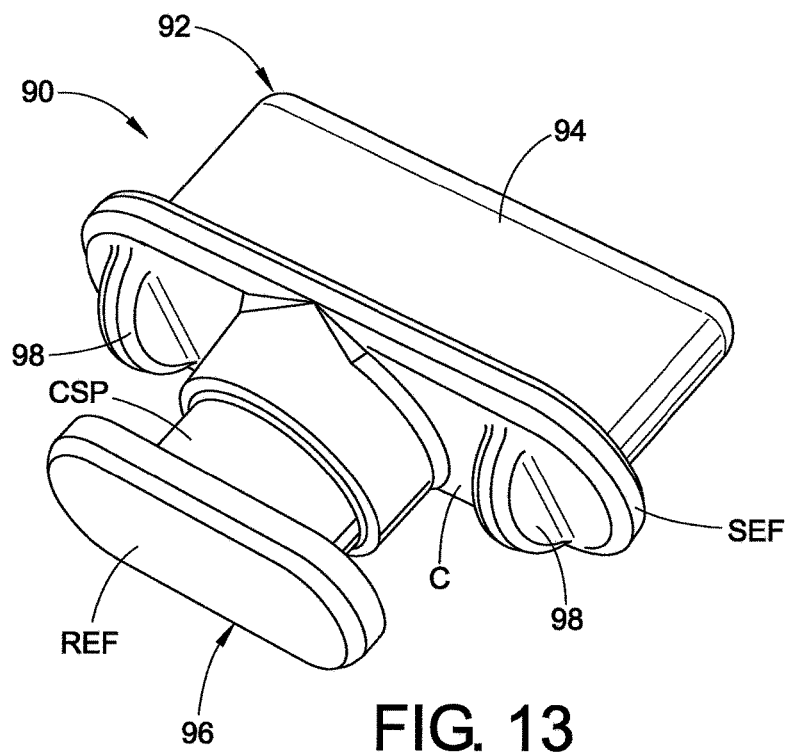
FIG. 13 is a perspective view of still yet another exemplary embodiment of a fastener for securing a rail to a wire shelf in accordance with the present disclosure.
Figure 14:
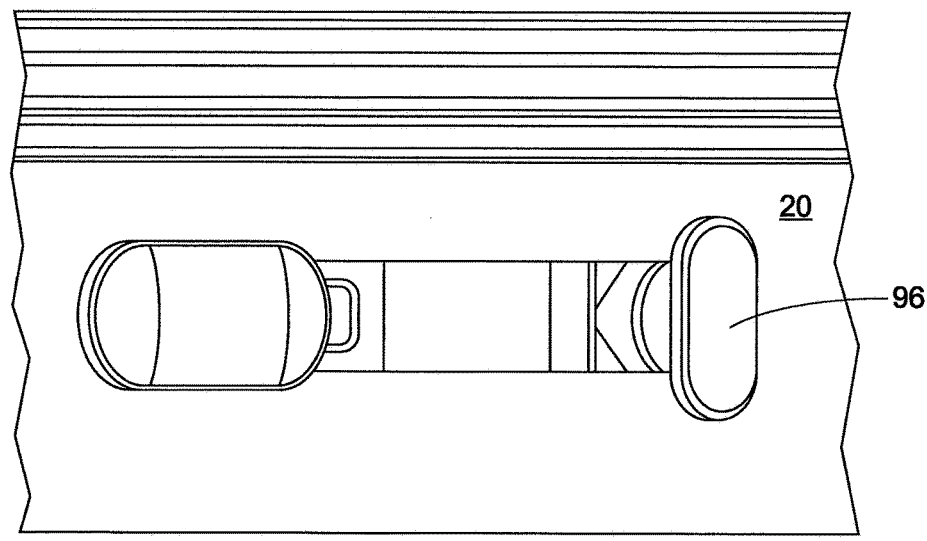
FIG. 14 is a top perspective view of the fastener of FIG. 13 securing a rail to a wire shelf.
Figure 15:
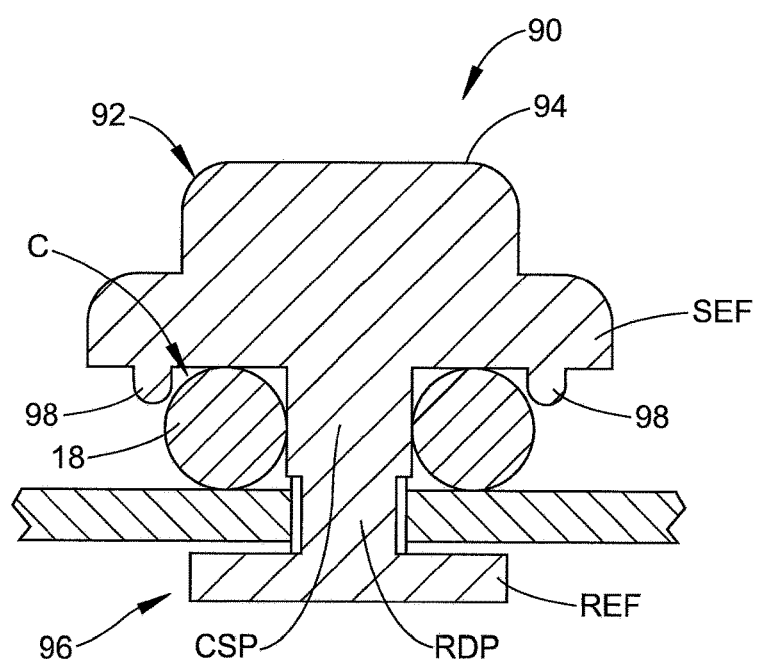
FIG. 15 a cross-sectional view of the exemplary fastener of FIG. 13 securing a rail to a wire shelf in accordance with the present disclosure.
Figure 16:
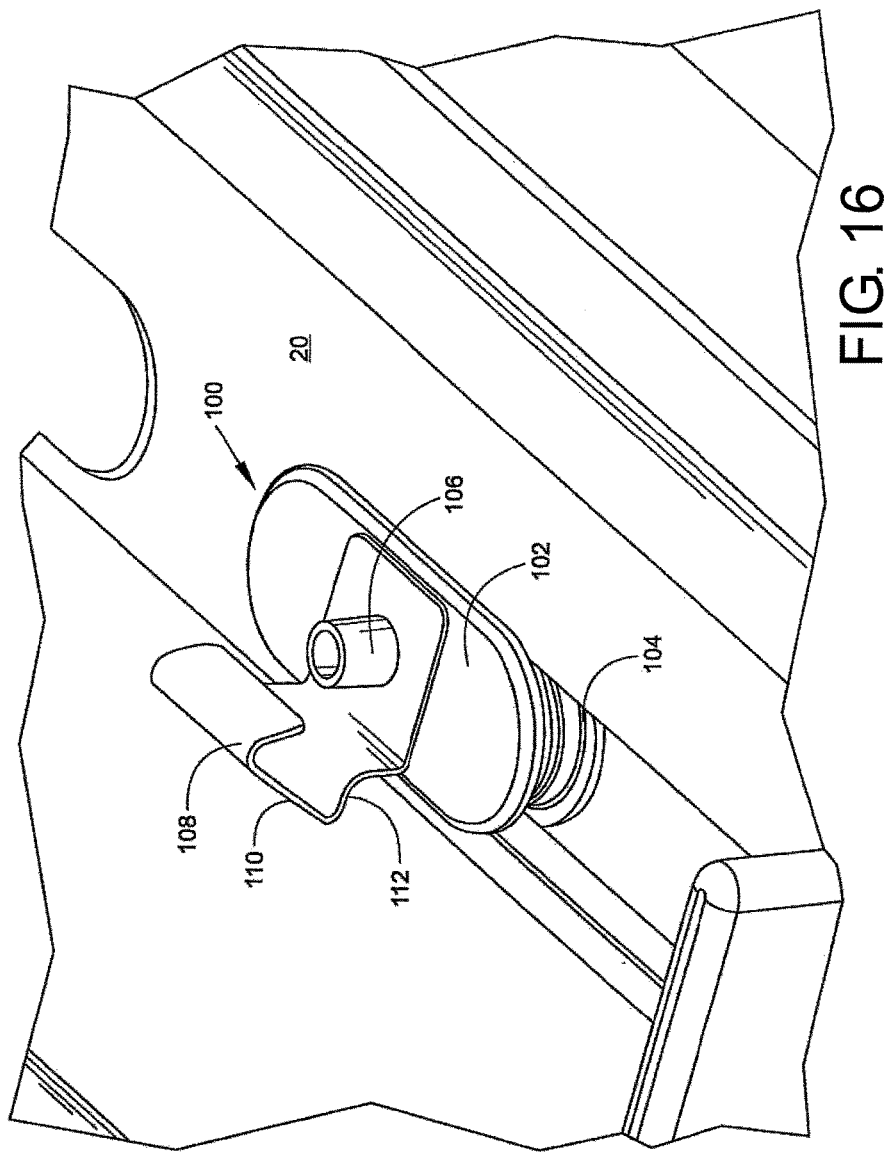
FIG. 16 is a bottom perspective view of another exemplary embodiment of a fastener for securing a rail to a wire shelf in accordance with the present disclosure.

FIGS. 13-15 illustrate a one piece twist-to-lock fastener 90 in accordance with the present disclosure. Fastener 90 includes an upper portion 92 including a finger grip 94 and a shelf engaging flange SEF. A lower portion 96 of the fastener 90 includes a rail engaging flange REF. The rail engaging flange REF and the shelf engaging flange SEF are connected by a connecting shaft portion CSP. The rail engaging flange REF and the shelf engaging flange SEF have a width generally corresponding to the diameter of the connecting shaft portion CSP. Each of the rail engaging flange REF and the shelf engaging flange SEF are generally flat and oval-shaped, and extend in a common direction from each end of the connecting shaft portion CSP. In the illustrated embodiment, the shelf engaging flange SEF has a longitudinal extent that is greater than the longitudinal extent of the rail engaging flange REF.

It will be appreciated that the rail engaging flange REF is insertable through a slot S or opening in a front rail 20 for engagement with a support rod 18 of a wire shelf (not shown in FIGS. 13 and 14). Once inserted through the opening in the front rail 20, the fastener 90 is rotated 90° whereby a pair of cam structures including cam surfaces 98 impinge on the front rail 20 adjacent said opening and act to draw the lower portion 96 into compressive engagement with the support rod 18. In this position, support rod 18 is trapped in channel C formed between the cam structure, shelf engaging flange SEF and the connecting shaft portion CSP. The cam structures further act as a detent to restrict rotation of the fastener once installed.

A reduced diameter portion RDP is generally sized to correspond to the width of the opening in the rail 20, with a shoulder 99 configured to engage a surface of the rail adjacent the opening. It will be appreciated that the rail engaging flange REF and shelf engaging flange SEF are spaced apart roughly the combined thickness of the front rail 20 and the support rod such that, when installed, the fastener holds the front rail 20 firmly on the shelf. Like the embodiments of FIGS. 4-12, fastener 90 can be installed by an end user during installation of a front rail to a wire shelf.

FIGS. 16-19 illustrate yet another exemplary embodiment of a fastener that typically will be installed at a factory, such as during production of a front rail, and enables quick securement of the front rail to a wire shelf. The fastener 100 includes a pair of plates 102 and 104 configured to engage opposing sides of a front rail 20. Plates 102 and 104 are secured together by a rivet 106, or other fastener (e.g, bolt or screw). Rivet 106 also secures a retention tab 108 to the plates 102, 104. Retention tab 108 has a leading wedge portion 110 and a curved support rod engagement portion 112. The leading wedge portion 110 is adapted to impinge upon support rod 18 as front rail 20 is lowered onto shelf 10. As the wedge portion 110 engages support rod 18, the retention tab 108 is deflected until curved rod engagement portion 112 clears the rod 18 at which point the retention tab 108 snaps into place thereby securing the front rail to the shelf 10. It will be appreciated that the retention tab 108 may typically be a spring metal or other resilient material to permit the described deflection.

The embodiments set forth in the previous paragraphs have been described in connection with horizontal wire shelves wherein the support rods generally run horizontally or in a direction parallel to a front edge of a shelf. It should be appreciated, however, that aspects of these embodiments can be utilized in connection with securing a front rail to a vertical wire shelf wherein the support rods run, extend, or are oriented perpendicular to a front edge of the shelf.

Referring now to FIGS. 20-32, several different embodiments are illustrated of fasteners in accordance with the present disclosure for securing a front rail to a wire shelf having vertically oriented (front to back) support rods or wires. In these embodiments, the shelf is generally identified by reference numeral 200. Shelf 200 has a pair of perimeter rods 202 and 204 located at a front edge of the shelf. A plurality of front to back support rods 208 extend between the front edge of the shelf and the rear of the shelf (not shown). The support rods 208 extend to the front edge of the shelf between the perimeter rods 202 and 204 thereby forming gaps G bounded by two adjacent support rods 208 and the upper and lower perimeter rods 202 and 204. The gaps G are utilized in some of the embodiments for interlocking a front rail to the shelf 200.

Turning to FIGS. 20 and 21, a sheet metal strip 220 with a clinch nut 222 is illustrated installed in two potential orientations. In this embodiment, a front rail 224 having a slot 226 therein is positioned on or adjacent a front edge of the shelf 200. The sheet metal retaining strip 220 is inserted through a gap G with a curved forward portion 228 of the sheet metal strip 220 engaging a portion of either perimeter rod 202 or 204, depending on the orientation on which the sheet metal strip 220 is installed. A bolt or other fastener 230 is passed through the opening 226 in the front rail 224 and tightened with clinch nut 222 to thereby secure the front rail 224 to the shelf 200. In the illustrated embodiment, the sheet metal strip 220 has a width approximately corresponding to the width between the support rods 208 such that, along with the curved leading portion 228 of the sheet metal strip 220, movement of the front rail 224 is restricted both forward and aft as well as side to side when installed.

Figure 22:
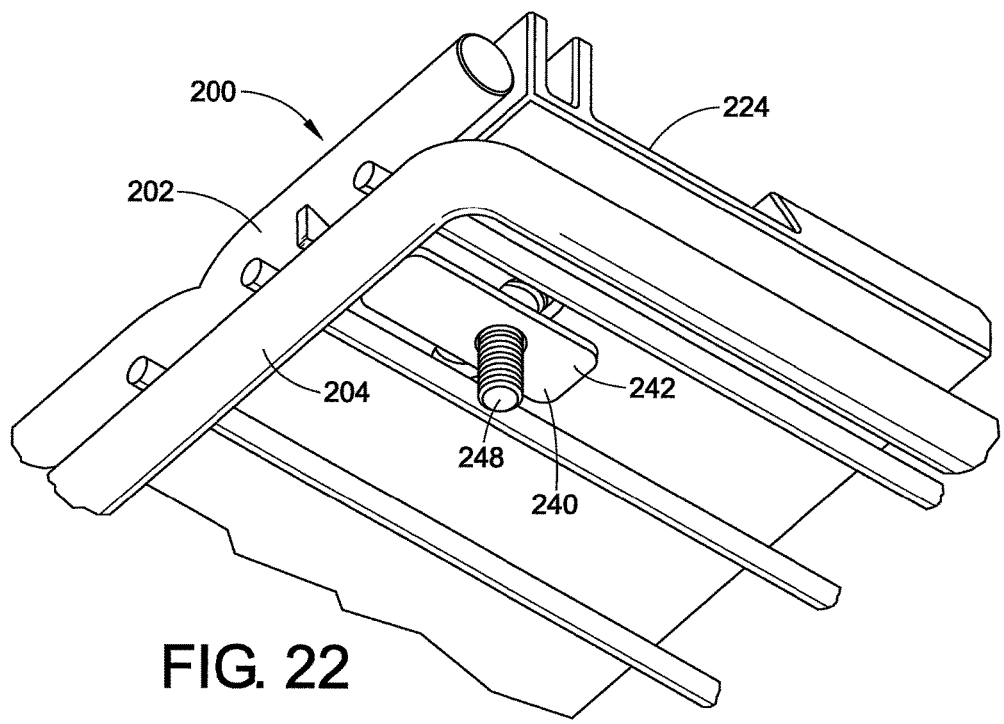
FIG. 22 is a bottom perspective view of a rail secured to a shelf with yet another exemplary fastener in accordance with the present disclosure.
Figure 23:
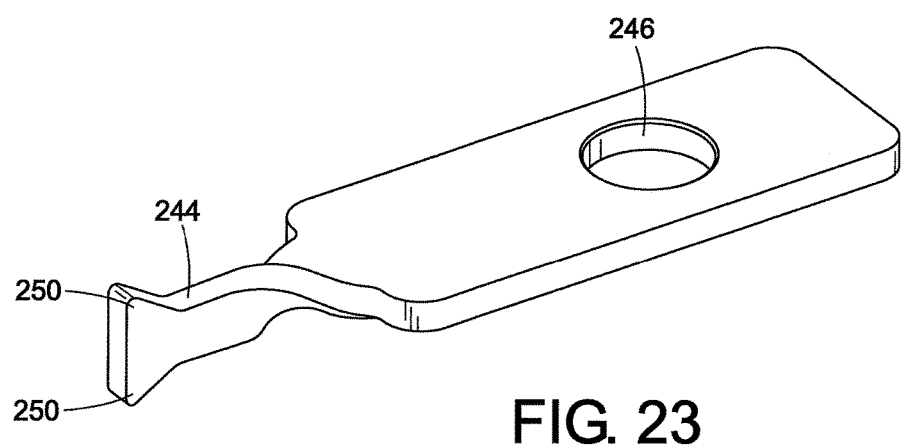
FIG. 23 is a perspective view of the fastener of FIG. 22.

Turning to FIGS. 22 and 23, another sheet metal strip for securing a front rail 224 to shelf 200 is illustrated. In this embodiment, the sheet metal strip 240 has a generally flat or planar rearward portion 242 and a front tab portion 244 that is twisted approximately 90° relative to a plane of the rear portion 242. A hole 246 is provided in the rear portion 242 for receiving a bolt 248 which can be secured with a nut (not shown) for attaching the strip 240 to the front rail 224. Alternatively, a clinched nut or other fastening mechanism such as a threaded bore can be provided for securing the metal strip 240 to the front rail 224. It will be appreciated that in this embodiment the tab portion 244 is inserted in the gap G between the perimeter rods 202 and 204 and then is rotated 90° thereby restricting rearward withdrawal of the leading edge of the tab portion 244. The leading edge of the tab portion 244 is provided with its respective ears 250 which engage with respective perimeter rods 202 and 204. The metal straps of these embodiments can be formed via a stamping process, for example.

Figure 24:
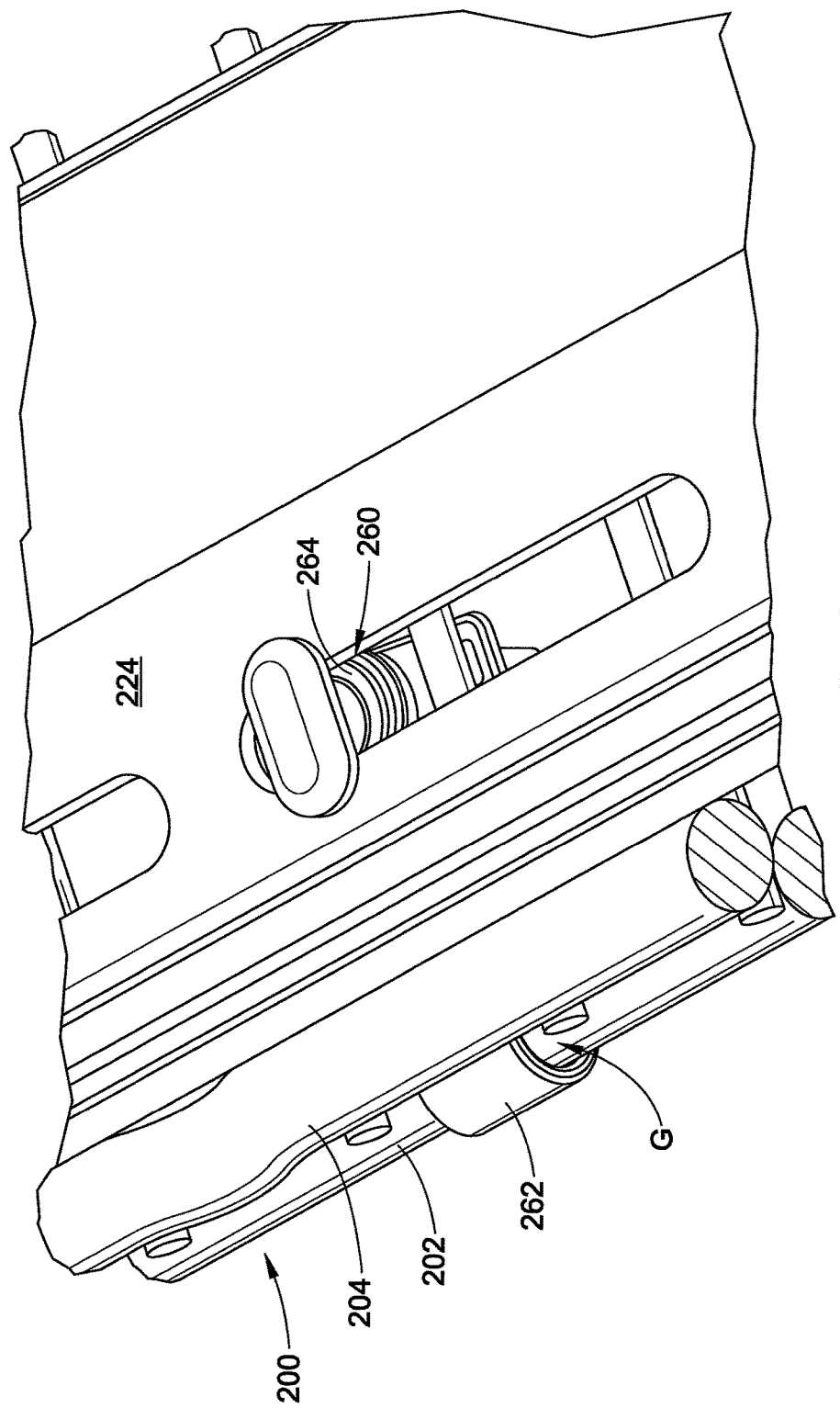
FIG. 24 is a top perspective view of a rail secured to a shelf with still yet another exemplary fastener in accordance with the present disclosure.
Figure 25:
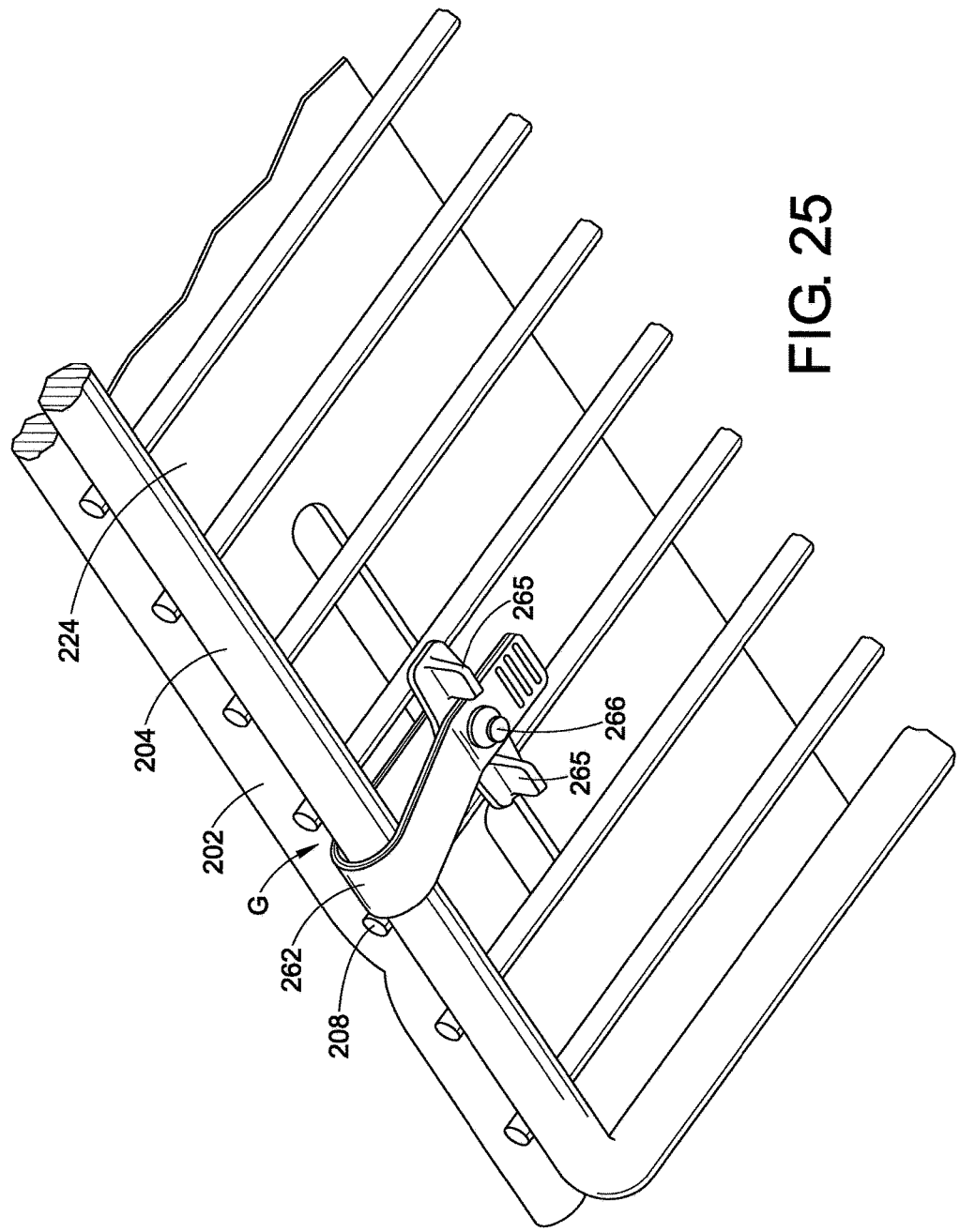
FIG. 25 is a bottom perspective view of the rail and shelf of FIG. 24.
Figure 26:
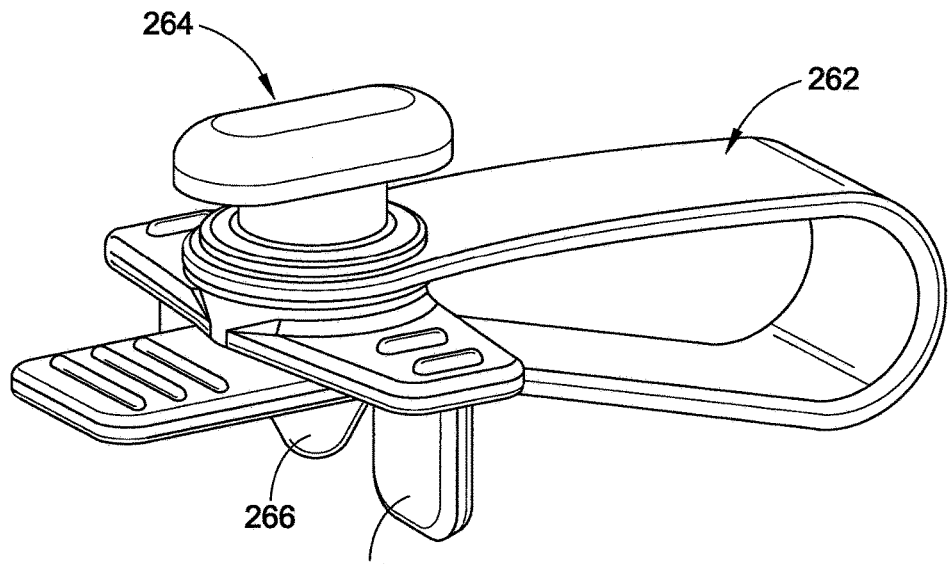
FIG. 26 is a perspective view of the fastener of FIG. 24.

In FIGS. 24-26, yet another exemplary embodiment of the fastener in accordance with the present disclosure is illustrated and generally identified by reference numeral 260. In this embodiment, a flexible strap 262, which can be metal or plastic or any other suitable material, is attached to a mounting fastener 264. The flexible strap 262 and fastener 264 are assembled to the bottom of the forward rail 224 by rotating the mounting fastener 264 90 degrees with finger tabs 265. The flexible strap 262 is then fed around one or the other of the perimeter rods 202 or 204 through gap G and snapped over a stud 266 on an end of the mounting fastener 264.

Figure 27:
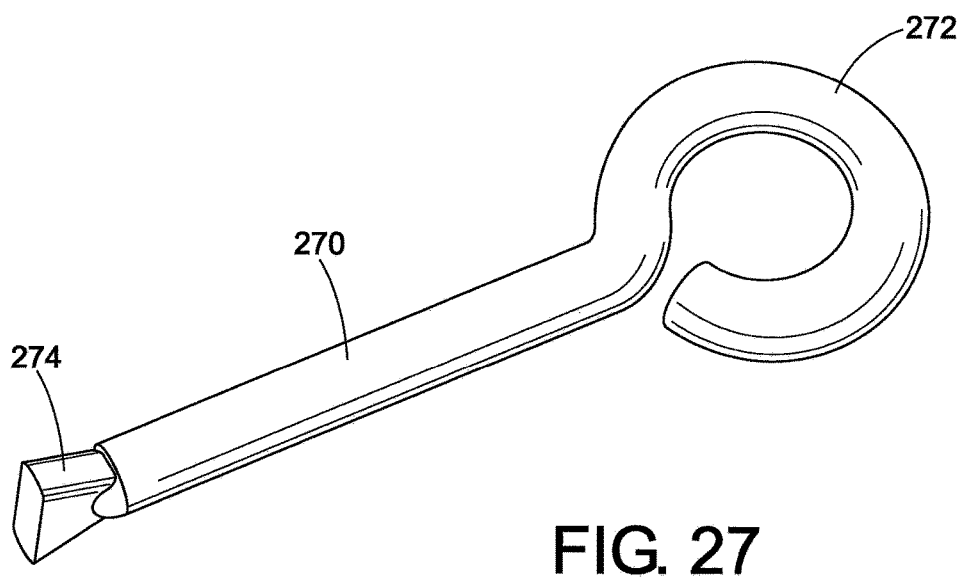
FIG. 27 is a perspective view of still another fastener for securing a rail to a wire shelf in accordance with the present disclosure.

Turning now to FIG. 27, an alternate fastener construction is there illustrated. In this embodiment, a bent wire fastener 270 is shown having a loop portion 272 for receiving a fastener such as a bolt and a head portion 274 that is flared for insertion into a gap G between the perimeter rods 202 or 204. The bent wire 270 is otherwise installed in the same manner as the sheet metal strap 242 described in connection with FIGS. 21 and 22. It will be appreciated that this fastener can be made using suitable wire forming methods.

Figure 28:
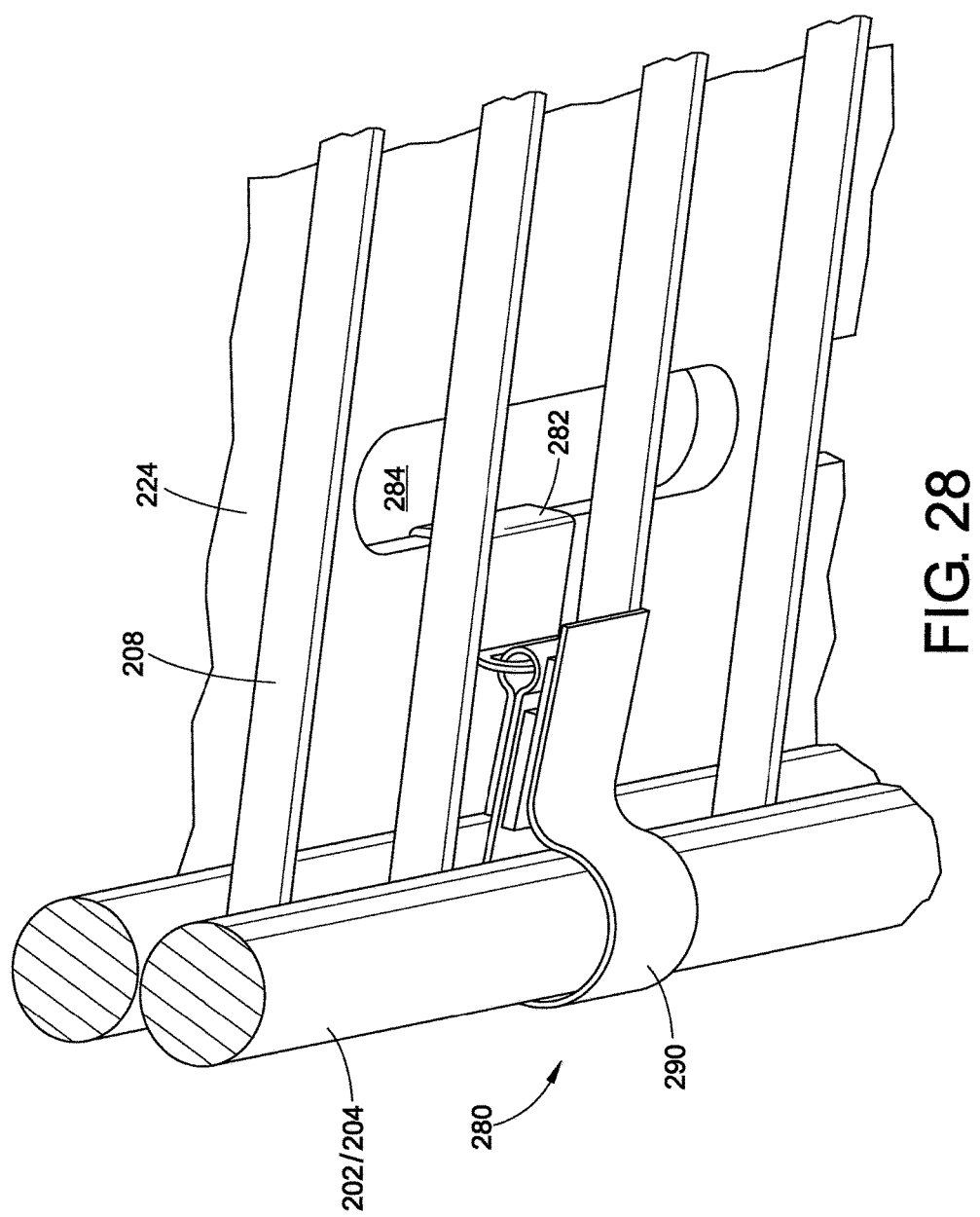
FIG. 28 is a bottom perspective view of a rail secured to a shelf with still yet another exemplary fastener in accordance with the present disclosure.
Figure 29:
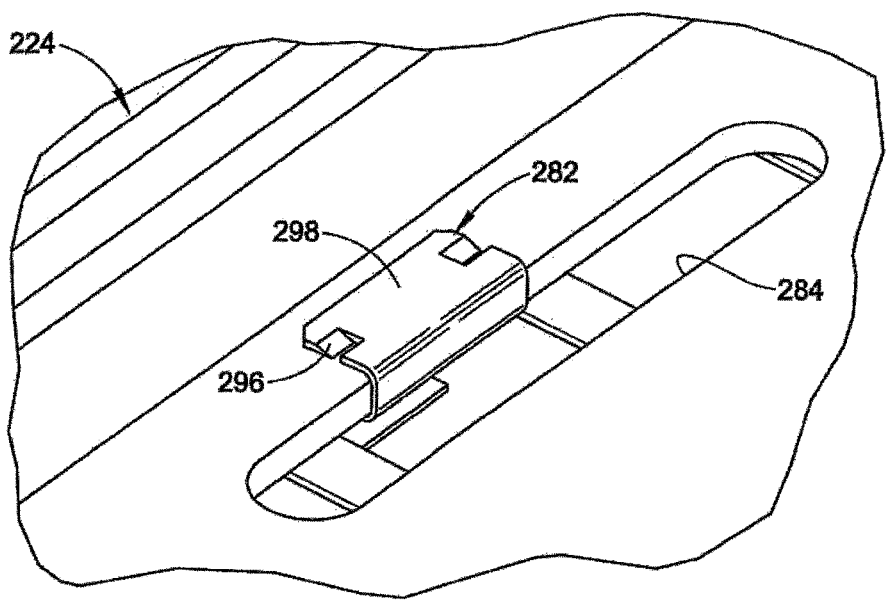
FIG. 29 is a top perspective view of the rail and shelf of FIG. 28.
Figure 30:
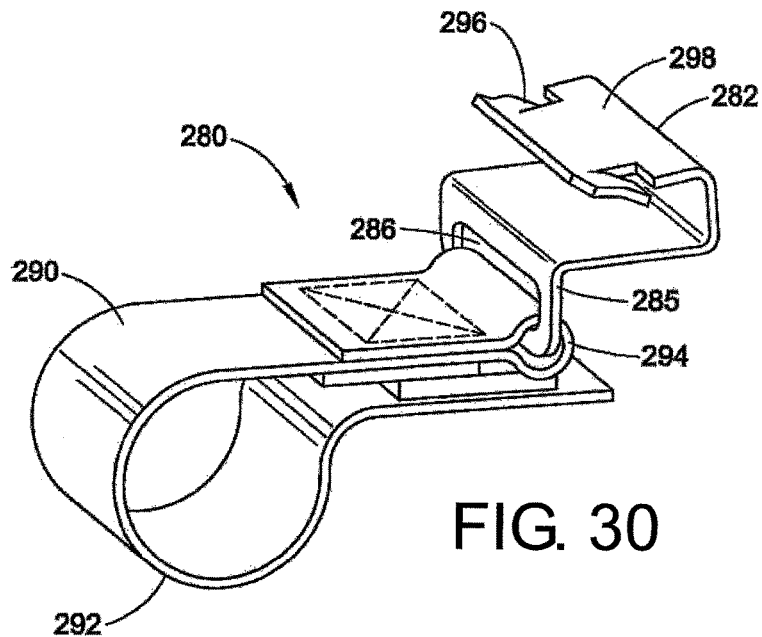
FIG. 30 is a perspective view of the fastener of FIG. 28.

In FIGS. 28-30, still another exemplary fastener in accordance with the present disclosure is illustrated and identified generally by reference numeral 280. In this embodiment, a sheet metal clip 282 is configured to grab an edge of an opening 284 in the front rail 224. The sheet metal clip 282 is generally U-shaped and includes a tab 285 extending down and having an opening 286 therein. A strap 290 with a hook end 292 and a loop end 294 wraps one of the perimeter rods 202, 204 with the loop portion 294 engaged with opening 286 thereby interlocking the strap 290 with the clip 282. The clip includes at least one tab 296 which extends away from a tab upper portion 298 to fasten the clip in place on the rail 224 as shown in FIG. 28.

Figure 31:
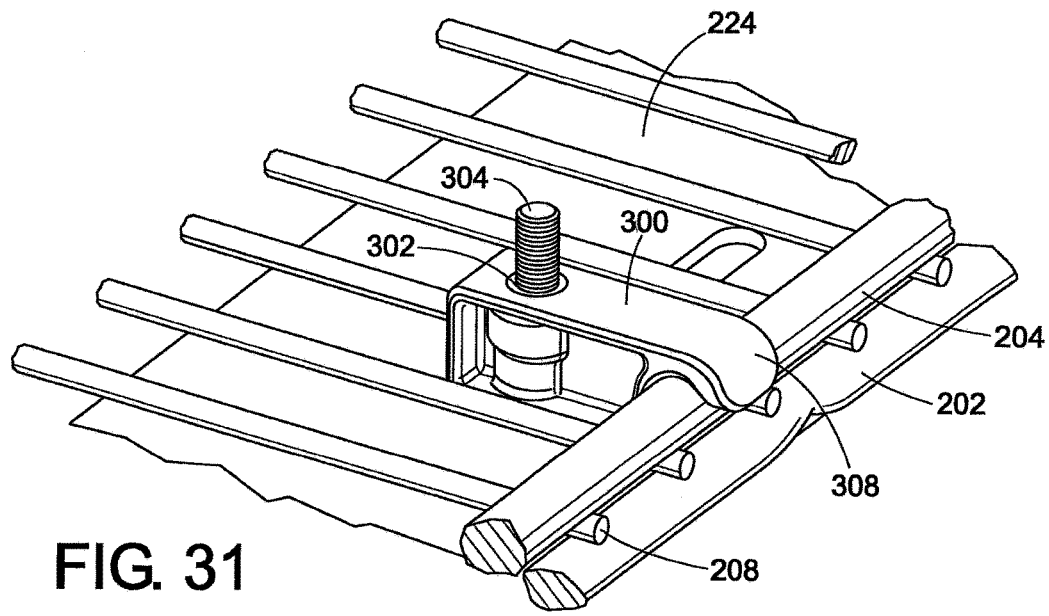
FIG. 31 is a bottom perspective view of a rail secured to a shelf with still yet another exemplary fastener in accordance with the present disclosure.
Figure 32:
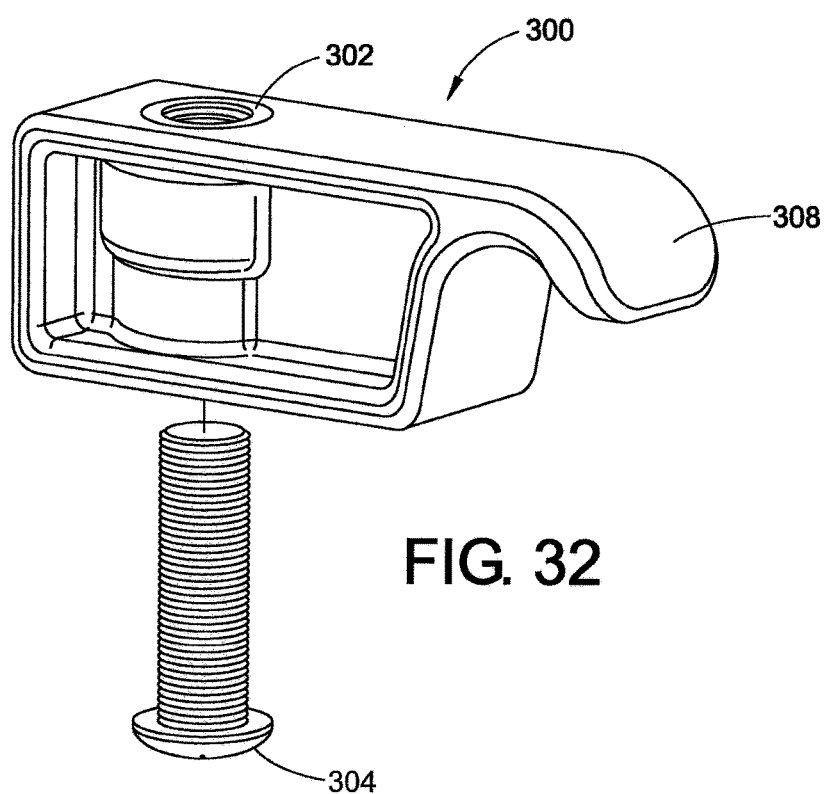
FIG. 32 is a perspective view of the fastener of FIG. 31.

In FIGS. 31 and 32, another exemplary embodiment includes an injection molded fastener 300 having a threaded insert 302 for receiving a fastener, such as a bolt or screw. The injection molded fastener 300 overlaps one of the perimeter rods 202 or 204 and is secured to front rail 224 with a fastener 304. A hook portion 308 of the bolted fastener 300 secures the fastener to the perimeter rod 204 opposite the front rail thereby restricting removal of the front rail 224 from the shelf 200. The fastener 300 has a width such that it can be at least partially received between adjacent support rods of a wire shelf.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A fastener system for securing an associated rail to an associated wire shelf having a plurality of spaced apart support rods extending in a common direction, the fastener system comprising:

a fastener body comprising a rail engaging member having a threaded insert, the rail engaging member including a first wall and a second wall opposing the first wall, a third wall, and a fourth wall opposing the third wall, the fastener body further comprising a shelf engaging member spaced apart from the rail engaging member, the shelf engaging member extending from the rail engaging member and including at least one contact structure that is adapted to engage a support rod of the associated wire shelf, the threaded insert extending through the rail engaging member from the first wall thereof to the second wall thereof;

wherein the shelf engaging member protrudes from the second wall of the rail engaging member and is spaced from the first wall of the rail engaging member; and wherein a connecting portion of the fastener is received in an elongate opening of the associated rail and the contact structure of the rail engaging member engages a support rod of the associated wire shelf.

2. The fastener system of claim 1, wherein the rail engaging member and the shelf engaging member are spaced apart a distance approximately equal to the combined thickness of the associated rail and the associated wire shelf.

3. The fastener system of claim 1, wherein the fastener body is unitary and of one piece.

4. A system for securing a rail to an associated wire shelf having a width and a length, a perimeter rod extending along and defining a leading edge of the associated wire shelf, the perimeter rod extending in a length direction, and a plurality of spaced apart support rods extending in parallel in a width direction, the system comprising:

a rail configured to be supported along the leading edge of the associated wire shelf, the rail including at least one elongate opening adapted to extend along the length direction when the rail is supported on the associated wire shelf; and a first fastener for securing the rail to the perimeter rod of the associated wire shelf;

wherein the first fastener includes a fastener body including a first wall and a second wall opposing the first wall, a third wall, and a fourth wall opposing the third wall such that the first wall contacts the rail, with a width less than a spacing between adjacent support rods of the associated wire shelf such that the fastener body is adapted to be at least partially received therebetween, a threaded insert supported in the fastener body and extending from the first wall thereof to the second wall thereof, and a threaded second fastener extending through the elongate opening and threadedly engaged with the threaded insert, the first fastener further including a hook portion extending from the fastener body and adapted to extend partially around and engage the perimeter rod of the associated wire shelf when a head of the threaded second fastener is tightened against the rail thereby securing the rail to the associated wire shelf.

5. The system of claim 4, wherein the fastener body comprises a plastic material.

6. The system of claim 5, wherein the threaded insert comprises a metal material.

7. A fastener system for securing an associated rail to an associated wire shelf having a width and a length, a perimeter rod extending along and defining a leading edge of the associated wire shelf, the perimeter rod extending in a length direction, and a plurality of spaced apart support rods extending from the perimeter rod in parallel in a width direction, the fastener system comprising:

a fastener body having an elongate shape with a width less than a spacing between adjacent support rods of the associated wire shelf such that the fastener body is adapted to be at least partially received therebetween wherein the fastener body comprises a first wall and a second wall opposing the first wall, a third wall, and a fourth wall opposing the third wall;

a threaded insert supported in the fastener body and extending between the first and second walls thereof for receiving a threaded fastener extending through the elongate opening of the associated wire shelf;

and a hook extending from the second wall of the fastener body and spaced from the first wall, wherein the hook is adapted to extend partially around and engage the perimeter rod of the associated wire shelf when a head of the threaded fastener is tightened against the associated rail thereby securing the associated rail to the associated wire shelf.

8. The fastener system of claim 7, wherein the fastener body comprises a plastic material.

9. The fastener system of claim 8, wherein the hook and the fastener body are unitary and of one piece.

10. The fastener system of claim 7, wherein the threaded insert comprises a metal material.

11. The system of claim 4, wherein the fastener body is unitary and of one piece.

12. The system of claim 4 wherein the threaded fastener comprises a stem portion connected to the head, the stem portion being threaded.

13. The system of claim 4 wherein the rail is elongated and extends parallel to the leading edge of the associated wire shelf.

14. The fastener system of claim 1 wherein the threaded insert comprises a metal material.

15. The fastener system of claim 1 wherein the threaded insert cooperates with a threaded fastener.

* * * * *